(12) United States Patent
Okubo et al.

(10) Patent No.: US 10,391,546 B2
(45) Date of Patent: Aug. 27, 2019

(54) METHOD FOR PRODUCING FORGED CRANKSHAFT

(71) Applicant: NIPPON STEEL & SUMITOMO METAL CORPORATION, Tokyo (JP)

(72) Inventors: Junichi Okubo, Amagasaki (JP); Kenji Tamura, Takatsuki (JP); Kunihiro Yoshida, Nishinomiya (JP); Samsoo Hwang, Nishinomiya (JP); Ryusuke Nakano, Nishinomiya (JP); Masao Hori, Matsubara (JP)

(73) Assignee: NIPPON STEEL CORPORATION, Tokyo (JP)

( * ) Notice: Subject to any disclaimer, the term of this patent is extended or adjusted under 35 U.S.C. 154(b) by 137 days.

(21) Appl. No.: 15/554,019

(22) PCT Filed: Mar. 23, 2016

(86) PCT No.: PCT/JP2016/059254
§ 371 (c)(1),
(2) Date: Aug. 28, 2017

(87) PCT Pub. No.: WO2016/152933
PCT Pub. Date: Sep. 29, 2016

(65) Prior Publication Data
US 2018/0071814 A1 Mar. 15, 2018

(30) Foreign Application Priority Data

Mar. 24, 2015 (JP) ................. 2015-060318
Oct. 27, 2015 (JP) ................. 2015-210373

(51) Int. Cl.
*B21J 5/02* (2006.01)
*B21J 5/12* (2006.01)
*B21K 1/08* (2006.01)

(52) U.S. Cl.
CPC ........ *B21K 1/08* (2013.01); *B21J 5/02* (2013.01); *B21J 5/12* (2013.01); *F16C 2220/46* (2013.01)

(58) Field of Classification Search
CPC ..... B21J 5/02; B21J 5/12; B21D 53/84; F16C 2220/46; F16C 3/08; B21K 1/08
See application file for complete search history.

(56) References Cited

FOREIGN PATENT DOCUMENTS

| JP | 62-244545 | 10/1987 |
| JP | 02-255240 | 10/1990 |

(Continued)

OTHER PUBLICATIONS

Machine Translation for Matsui, WO 2014091730 A1 (Year: 2014).*

*Primary Examiner* — Christopher J Besler
*Assistant Examiner* — Christine Pellazar Bersabal
(74) *Attorney, Agent, or Firm* — Clark & Brody

(57) ABSTRACT

A forged crankshaft production method includes a first preforming step, a second preforming step, and a final preforming step. In the first preforming step, sectional areas of portions to be formed into pins and sectional areas of portions to be formed into journals are decreased, whereby flat portions are formed, and the portion to be formed into the pin located at a second position is decentered. In the second preforming step, a portion to be formed into the pin located at a first position is decentered, and a portion to be formed into the pin located at a third position is decentered to a side opposite to the portion to be formed into the pin located at the first position. In a blank obtained thereby, portions to be formed into pins have been reduced and decentered, and the material yield rate can be improved.

8 Claims, 17 Drawing Sheets

(56) References Cited

FOREIGN PATENT DOCUMENTS

| JP | 2001-105087 | 4/2001 | |
|---|---|---|---|
| JP | 2014-036730 | 2/2014 | |
| WO | 2014-091730 | 6/2014 | |
| WO | WO-2014091730 A1 * | 6/2014 | ............... B21K 1/08 |

* cited by examiner

IB-IB

VIIA-VIIA

VIIB-VIIB

XIIIA-XIIIA

XXIIA-XXIIA

XXIIB-XXIIB

XXVA-XXVA

XXVB-XXVB

METHOD FOR PRODUCING FORGED CRANKSHAFT

TECHNICAL FIELD

The present invention relates to a method for producing a crankshaft by hot forging.

BACKGROUND ART

A reciprocating engine to be employed in a motor vehicle, a motorcycle, an agricultural machine, a marine vessel or the like requires a crankshaft to extract power by converting reciprocating motions of pistons to rotational motion. There are two types of crankshafts: the type manufactured by die forging and the type manufactured by casting. Especially when high strength and high stiffness are required, die forged crankshafts (which will hereinafter be referred to as "forged crankshafts") are often employed.

FIGS. 1A to 1C are schematic diagrams showing an example of a shape of a commonly used crankshaft. FIG. 1A is an overall view, FIG. 1B is a sectional view along the line IB-IB, and FIG. 1C shows the phases of pins. In order to facilitate understanding of the shape of the crankshaft, FIG. 1B shows only a crank arm A1, a counterweight W1 integrated with the crank arm A1, a pin P1 and a journal J1 connected to the crank arm A1, which are extracted from the crankshaft.

The crankshaft 11 shown in FIGS. 1A to 1C is a four-counterweight crankshaft to be mounted in a three-cylinder engine. The crankshaft 11 includes four journals J1 to J4, three pins P1 to P3, a front part Fr, a flange Fl, and six crank arms (hereinafter referred to simply as "arms") A1 to A6. The six arms A1 to A6 connect the journals J1 to J4 respectively to the pins P1 to P3. Some of the six arms A1 to A6 have counterweights (hereinafter referred to simply as "weights") W1 to W4, respectively, which are integrated therewith. Specifically, the first arm A1, the second arm A2, the fifth arm A5 and the sixth arm A6 incorporate the weight W1, W2, W3 and W4, respectively. The third arm A3 and the fourth arm A4 do not have weights.

The front part Fr is located at a front edge of the crankshaft 11, and the flange Fl is located at a rear edge of the crank shaft 11, the front edge and the rear edge being edges in a direction along the axis of the crankshaft 11. The front part Fr is connected to the front first journal J1, and the flange Fl is connected to the rearmost fourth journal J4.

In the following paragraphs, when the journals J1 to J4, the pins P1 to P3, the arms A1 to A6, and the weights W1 to W4 are each collectively referred to, a reference character "J" is used for the journals, a reference character "P" for the pins, a reference character "A" for the arms, and a reference character "W" for the weights. An arm A and a weight W integrated therewith are referred to collectively as a "web".

As shown in FIG. 1C, the pins P1 to P3 are arranged at intervals of 120 degrees around the journals. In other words, each of the pins P1 to P3 is located at a first position L1, a second position L2 or a third position L3, and the phase differences among the first to the third positions L1 to L3 are 120 degrees.

As shown in FIG. 1B, the width Bw of the weights W is greater than the width Ba of the arms A. Accordingly, each of the weights W bulges greatly from an arm center plane (a plane including the axis of the pin P and the axis of the journal J).

A forged crankshaft having such a shape is generally produced by using a billet as a starting material. A section of the billet in a direction perpendicular to the longitudinal direction thereof, that is, a cross section of the billet is circular or square, and the cross-sectional area is constant throughout the length. In the following paragraphs, a section of a crankshaft in a direction perpendicular to the axis of the crankshaft is referred to as a "cross section", and a section of the crankshaft in a direction parallel to the axis of the crankshaft is referred to as a "longitudinal section". The area of the cross section is referred to simply as a "sectional area". A method for producing a forged crankshaft includes a preforming step, a die forging step, and a trimming step that are to be executed in this order. After the trimming step, a coining step may be executed if needed. Typically, the preforming step includes a rolling step and a bending step, and the die forging step includes a rough forging step and a finish forging step.

FIGS. 2A to 2F are schematic diagrams showing a conventional method for producing a common forged crankshaft. FIG. 2A shows a billet, FIG. 2B shows a rolled blank, FIG. 2C shows a bent blank, FIG. 2D shows a rough forged blank, FIG. 2E shows a finish forged blank, and FIG. 2F shows a forged crankshaft. FIGS. 2A to 2F show a method for producing a crankshaft having the configuration shown in FIGS. 1A to 1C.

In the production method shown in FIGS. 2A to 2F, a forged crankshaft 11 is produced as follows. First, a billet 12 with a specified length as shown in FIG. 2A is heated in a heating furnace, and in a preforming step, the heated billet is rolled and subsequently bent. In the rolling, the billet 12 is rolled and reduced, for example, by grooved rolls. This is to distribute the volume of the billet 12 in the axial direction, and thereby, a rolled blank 13, which is an in-process material, is obtained (see FIG. 2B). Next, in the bending, the rolled blank 13 is partly pressed and reduced from a direction perpendicular to the axial direction. This is to distribute the volume of the rolled blank 13, and thereby, a bent blank 14, which is a next in-process material, is obtained (see FIG. 2C).

Next, in a rough forging step, the bent blank 14 is forged by a pair of an upper die and a lower die, and thereby, a rough forged blank 15 is obtained (see FIG. 2D). The rough forged blank 15 is roughly in the shape of the crankshaft (final product). In the finish forging step, the rough forged blank 15 is forged by a pair of an upper die and a lower die, and thereby, a finish forged blank 16 is obtained (see FIG. 2E). The finish forged blank 16 has a shape in agreement with the shape of the finished crankshaft. During the rough forging and the finish forging, excess material flows out through a space between the mutually facing parting faces of the dies, which results in formation of flash B. Accordingly, the rough forged blank 15 and the finish forged blank 16 have great flash B on the periphery.

In a trimming step, for example, while the finish forged blank 16 is nipped and held by a pair of dies, the finish forged blank 16 is punched by a cutting die. Thereby, the flash B is removed from the finish forged blank 16, and a forged blank with no flash is obtained. The forged blank with no flash has substantially the same shape as the forged crankshaft 11 shown in FIG. 2F.

In a coining step, main parts of the forged blank with no flash are slightly pressed by dies from above and below so that the forged blank with no flash can have the exact size and shape of the final product. The main parts of the forged blank with no flash are, for example, shaft parts such as the journals J, the pins P, the front part Fr, the flange Fl and the like, and further, the arms A and the weights W. In this way, the forged crankshaft 11 is produced. It is noted that, when the crankshaft to be produced is a three-cylinder four-counterweight crankshaft or the like wherein the pins are arranged around the journals at intervals of 120 degrees, after the trimming step, a twisting step may be additionally executed for adjustment of the placement angles of the pins.

The production method shown in FIGS. 2A to 2F are applicable not only to production of a three-cylinder four-counterweight crankshaft as shown in FIGS. 1A to 1C but also to production of any other crankshaft. For example, crankshafts to be mounted in four-cylinder engines, in-line six-cylinder engines, V-type six-cylinder engines, eight-cylinder engines and others can be produced by the same production method.

The main purpose of the preforming step is distributing the volume of the billet, and therefore, the blank obtained thereby is hardly in the form of the forged crankshaft. By distributing the volume of the billet in the preforming step, it is possible to decrease the outflow of material and accordingly to decrease the formation of flash in the next die forging step, thereby improving the material yield rate. The material yield rate means the rate (percentage) of the volume of the forged crankshaft (final product) to the volume of the billet.

For example, Japanese Patent Application Publication No. 2001-105087 (Patent Literature 1), Japanese Patent Application Publication No. H2-255240 (Patent Literature 2) and Japanese Patent Application Publication No. S62-244545 (Patent Literature 3) disclose techniques relating to production of a forged crankshaft. Patent Literature 1 teaches a preforming step using a pair of an upper die and a lower die. During pressing of a rod-like workpiece by use of an upper die and a lower die in the preforming step, while a part of the workpiece is elongated, another part connecting thereto is offset from the axis. In the preforming step disclosed in Patent Literature 1, rolling and bending are performed at the same time, which allows a decrease in investment for facilities.

According to Patent Literature 2, in a preforming step, a four-pass high-speed rolling, rather than a conventional two-pass rolling, is performed. A rolled blank obtained by the preforming step has sectional areas that are congruent with the sectional area distribution among weights, arms and journals of the forged crankshaft (final product). According to Patent Literature 2, this improves the material yield rate.

According to Patent Literature 3, in a preforming step, a billet is pressed while being nipped by at least two dies that are movable relative to each other. By rolling operation of the dies, the material of the billet is distributed in the axial direction and the radial direction. Thereby, a blank having a shape that is asymmetric about the axis and is congruent with the general shape of the crankshaft to be produced can be obtained. In the production method disclosed in Patent Literature 3, a blank having a shape that is asymmetric about the axis can be obtained only by the preforming step, which allows direct advancement to a die forging step.

CITATION LIST

Patent Literature

Patent Literature 1: Japanese Patent Application Publication No. 2001-105087
Patent Literature 2: Japanese Patent Application Publication No. H2-255240
Patent Literature 3: Japanese Patent Application Publication No. S62-244545
Patent Literature 4: WO2014/091730

SUMMARY OF INVENTION

Technical Problems

Regarding production of a forged crankshaft, as mentioned above, it is demanded to decrease the outflow of material and accordingly to decrease the formation of flash, thereby improving the material yield rate. In the preforming step disclosed in Patent Literature 1, volume distribution of the billet and offset of portions to be formed into pins (which will hereinafter be referred to as "pin equivalent portions") can be performed to some extent. However, the offset of pin equivalent portions and the volume distribution are inadequate, and in the next die forging step, great flash is formed along with formation of pins.

The preforming step taught in Patent Literature 2 is to apply rolling, and therefore, it is not possible to decenter pin equivalent portions in the preforming step. Accordingly, in the next die forging step, great flash is formed along with formation of pins.

In the production method disclosed in Patent Literature 3, it is possible to achieve offset of pin equivalent portions and volume distribution of a billet to some extent without forming flash by the preforming step. However, a special facility for rolling is required, and implementation of the production method is not easy. Also, the offset of pin equivalent portions and the volume distribution are inadequate, and in the next die forging step, great flash is formed along with formation of pins.

An object of the present invention is to provide a forged crankshaft production method that achieves an improved material yield rate by decentering and pressing portions of a blank to be formed into pins.

Solutions to Problem

A forged crankshaft production method according to an embodiment of the present invention is a method for producing a forged crankshaft including journals serving as a center of rotation, pins decentered from the journals and located at a first position, a second position and a third position, respectively, having phase differences of 120 degrees thereamong, crank arms connecting the journals and the pins, and counterweights integrated with some or all of the crank arms.

The production method includes a first preforming step, a second preforming step, and a final preforming step. In the first preforming step, a workpiece is pressed by a first pair of dies. Thereby, sectional areas of portions of the workpiece to be formed into the pins and sectional areas of portions of the workpiece to be formed into the journals are decreased, whereby the portions to be formed into the pins and the portions to be formed into the journals are formed into flat portions, and one of the flat portions to be formed into the pin located at the second position is decentered. In the second preforming step, an initial blank obtained by the first preforming step is pressed by a second pair of dies with a direction perpendicular to the decentering direction of the portion to be formed into the pin located at the second position set as a pressing direction. Thereby, the portion to be formed into the pin located at the first position is decentered, and the portion to be formed into the pin located at the third position is decentered to a side opposite to the portion to be formed into the pin located at the first position. In the final preforming step, an intermediate blank obtained by the second preforming step is pressed by a third pair of dies. Thereby, the portion to be formed into the pin located at the first position is further decentered, and the portion to be formed into the pin located at the third position is further decentered.

The workpiece is a billet or a stepped blank. The stepped blank has small sectional areas in the portions to be formed into the pins and in the portions to be formed into the journals, and the small sectional areas are smaller than a total of a sectional area of a portion to be formed into a crank arm incorporating a counterweight and a sectional area of a portion to be formed into the counterweight integrated with the crank arm.

The first pair of dies includes pin processing portions to come into contact with the portions to be formed into the pins and journal processing portions to come into contact with the portions to be formed into the journals. In the first preforming step, the workpiece is pressed by the pin processing portions and the journal processing portions, whereby the flat portions are formed.

In the final preforming step, the direction of the pressing by the third pair of dies may be perpendicular to the decentering direction of the portion to be formed into the pin located at the second position.

The forged crankshaft may further include a front part at a front end in an axial direction. In this case, it is preferred that the first pair of dies further includes a front processing portion to come into contact with a portion of the workpiece to be formed into the front part. In the first preforming step, it is preferred that the front processing portion elongates the portion to be formed into the front part in the axial direction while decreasing a sectional area of the portion to be formed into the front part to form the portion to be formed into the front part into a flat portion.

When the first pair of dies includes the front processing portion, in the first preforming step, the front processing portion presses the portion to be formed into the front part preferably such that, in the initial blank, a sectional area of the portion to be formed into the front part decreases with decreasing distance from an end surface of the front part.

The forged crankshaft may further include a flange at a rear end in the axial direction. In this case, it is preferred that the first pair of dies further includes a flange processing portion to come into contact with a portion of the workpiece to be formed into the flange. In the first preforming step, while the flat portions are being formed, an end surface of the portion to be formed into the flange is preferably brought into contact with the flange processing portion, whereby a sectional area of the portion to be formed into the flange is increased.

In the second preforming step, the portions to be formed into the crank arms incorporating the counterweights are processed preferably to be thicker than a finished size, and the portions to be formed into the counterweights integrated with the crank arms are processed preferably to be thicker than a finished size. In this case, in the final preforming step, during the pressing by the third pair of dies, the portions of the intermediate blank to be formed into the crank arms incorporating the counterweights and the portions to be formed into the counterweights integrated with the crank arms are pressed from the axial direction of the intermediate blank.

In the second pair of dies used in the second preforming step preferably includes web processing portions to come into contact with the portions to be formed into the crank arms incorporating the counterweights and the portions to be formed into the counterweights integrated with the crank arms. In this case, each of the web processing portions includes an arm processing part to come into contact with a portion to be formed into a crank arm and a weight processing part to come into contact with a portion to be formed into a counterweight integrated with the crank arm, and both of the arm processing part and the weight processing part are provided in one of the second pair of dies. The arm processing part and the weight processing part form a recessed portion, where the arm processing part is located in a bottom side of the recessed portion and the weight processing part is located in an open side of the recessed portion. The width of an open side of the weight processing part becomes greater with increasing distance from the bottom of the recessed portion. In the second preforming step, as the portions to be formed into the pins located at the first position and at the third position are being decentered, the portions to be formed into the crank arms incorporating the counterweights and the portions to be formed into the counterweights integrated with the crank arms are pushed into the bottom sides of the web processing portions and are deformed.

In the second preforming step, when the portions to be formed into the crank arms incorporating the counterweights and the portions to be formed into the counterweights integrated with the crank arms are pushed into the bottom sides of the web processing portions and are deformed, the portions to be formed into the crank arms incorporating the counterweights and the portions to be formed into the counterweights integrated with the crank arms are pressed preferably from the open sides of the web processing portions for volume distribution.

Advantageous Effects of Invention

In the forged crankshaft production method according to the present invention, the portion to be formed into the pin located at the second position is decentered in the first preforming step, and is decreased in cross-section in the first preforming step and the second preforming step. The portion to be formed into the pin located at the first position and the portion to be formed into the pin located at the third position are decentered in the second preforming step and the final preforming step, and are decreased in cross-section in the first preforming step and the second preforming step. This decreases formation of flash caused by formation of pins in the next die forging step (finish forging step), and accordingly improves the material yield rate.

DESCRIPTION OF EMBODIMENTS

A forged crankshaft production method according to an embodiment of the present invention will hereinafter be described with reference to the drawings.

1. Exemplary Production Process

Figure 1A:
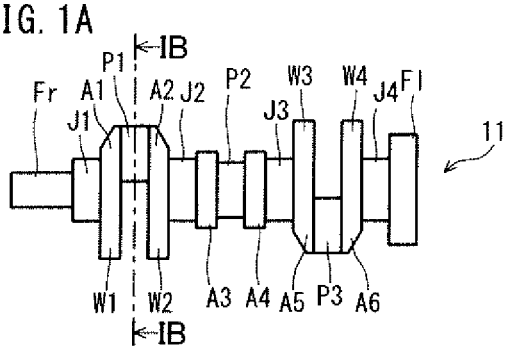
FIG. 1A is an overall view of a common crankshaft schematically showing an example of a shape thereof.
Figure 1B:
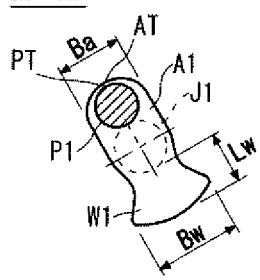
FIG. 1B is a sectional view along the line IB-IB in FIG. 1A.
Figure 1C:
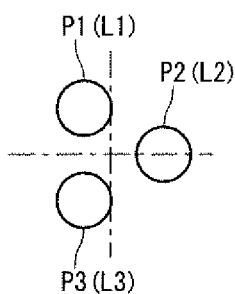
FIG. 1C is a diagram showing the phases of pins of the crankshaft shown in FIG. 1A.
Figure 2A:
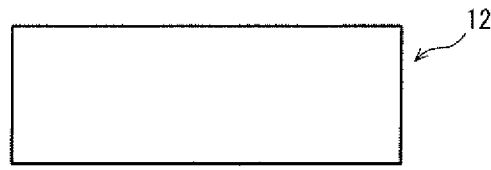
FIG. 2A is a schematic diagram of a billet during a conventional process of producing a common forged crankshaft.
Figure 2B:
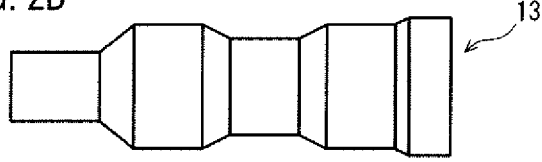
FIG. 2B is a schematic diagram of a rolled blank during the conventional process of producing a common forged crankshaft.
Figure 2C:
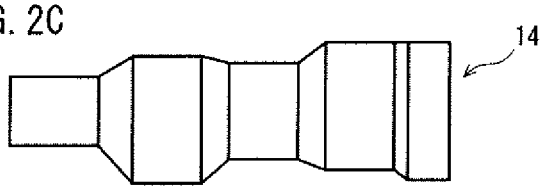
FIG. 2C is a schematic diagram of a bent blank during the conventional process of producing a common forged crankshaft.
Figure 2D:
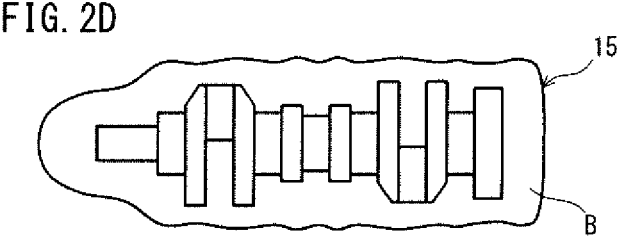
FIG. 2D is a schematic diagram of a rough forged blank during the conventional process of producing a common forged crankshaft.
Figure 2E:
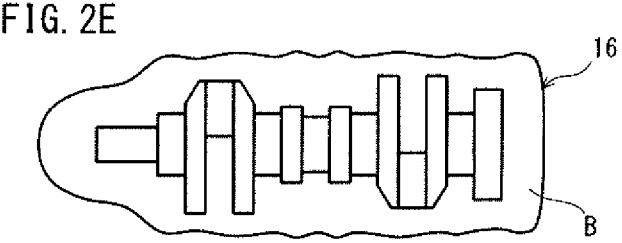
FIG. 2E is a schematic diagram of a finish forged blank during the conventional process of producing a common forged crankshaft.
Figure 2F:
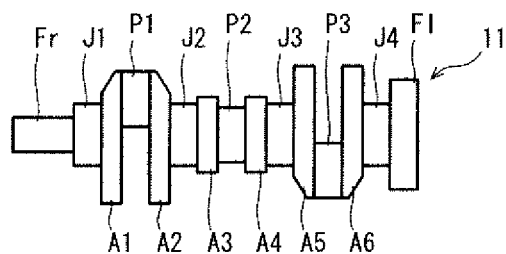
FIG. 2F is a schematic diagram of a crankshaft during the conventional process of producing a common forged crankshaft.

The method according to the present embodiment is intended to produce a forged crankshaft including journals J serving as a center of rotation, pins P decentered from the journals J, arms A connecting the journals J and the pins P, and weights W integrated with some or all of the arms A (see FIGS. 1A to 1C). The pins (P1 to P3) are located at a first position L1, a second position L2 and a third position L3, respectively. The phase differences among the first position L1, the second position L2 and the third position L3 are 120 degrees. The method is applicable to production of a three-cylinder four-counterweight crankshaft as shown in FIGS. 1A to 1C.

The forged crankshaft production method according to the present embodiment includes a first preforming step, a second preforming step, and a final preforming step to be executed in this order. After the final preforming step, a finish forging step and a trimming step may be additionally executed. If necessary, a coining step may be executed after the trimming step. Adjustment of the placement angles of the pins can be performed after the finish forging step. Alternatively, after the trimming step, a twisting step may be executed for adjustment of the placement angles of the pins. These steps are hot working and executed sequentially.

Figure 3A:
FIG. 3A is a schematic diagram of a billet during an exemplary forged crankshaft production process according to the present invention.
Figure 3B:
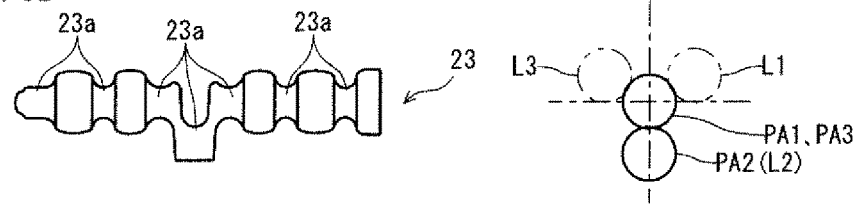
FIG. 3B includes a front view of an initial blank during the exemplary forged crankshaft production process according to the present invention, and a side view of the initial blank showing the positions of pin equivalent portions.
Figure 3C:
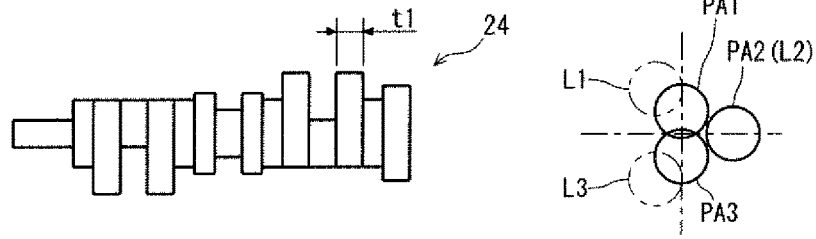
FIG. 3C includes a front view of an intermediate blank during the exemplary forged crankshaft production process according to the present invention, and a side view of the intermediate blank showing the positions of pin equivalent portions.
Figure 3D:
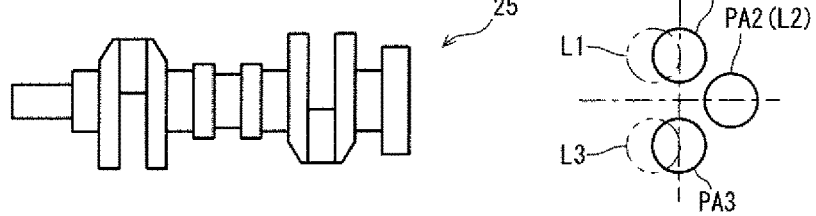
FIG. 3D includes a front view of a final blank during the exemplary forged crankshaft production process according to the present invention, and a side view of the final blank showing the positions of pin equivalent portions.
Figure 3E:
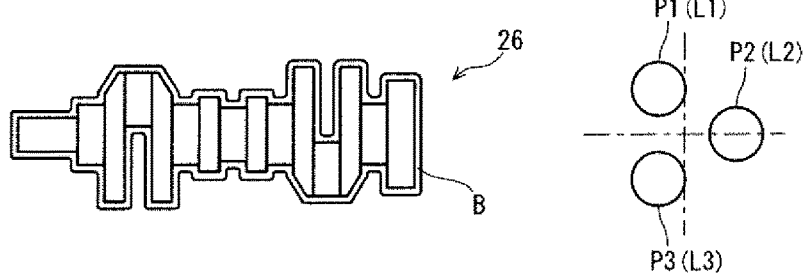
FIG. 3E includes a front view of a forged blank during the exemplary forged crankshaft production process according to the present invention, and a side view of the forged blank showing the positions of pins.
Figure 3F:
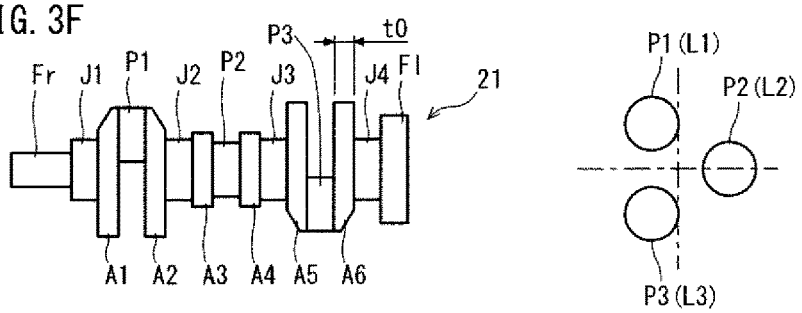
FIG. 3F includes a front view of a crankshaft during the exemplary forged crankshaft production process according to the present invention, and a side view of the crankshaft showing the positions of pins.

FIGS. 3A to 3F are diagrams showing an exemplary forged crankshaft production process according to the present invention. FIG. 3A shows a billet. FIG. 3B shows an initial blank in a front view and in a side view, FIG. 3C shows an intermediate blank in a front view and in a side view, and FIG. 3D shows a final blank in a front view and in a side view. FIG. 3E shows a forged blank in a plan view and in a side view, and FIG. 3F shows a forged crankshaft in a plan view and in a side view. FIGS. 3A to 3F show an exemplary production process of a crankshaft having the shape shown in FIGS. 1A to 1C. The side views in the right side of FIGS. 3B to 3D show the positions of pin equivalent portions PA1 to PA3 relative to the center of portions to be formed into journals (which will hereinafter be referred to as "journal equivalent portions"). The side views in the right side of FIGS. 3E and 3F show the positions of the pins P1 to P3 relative to the center of the journals. In the side views in the right side of FIGS. 3B to 3D, additionally, the first to the third positions L1 to L3 of the pins of the finished forged crankshaft are indicated by imaginary lines.

In the first preforming step, a workpiece is pressed by a first pair of dies. In the preforming step of this exemplary production process, a billet 22 is pressed by a first pair of dies. Thereby, the pin equivalent portions and the journal equivalent portions of the billet 22 are crushed, and flat portions 23a are formed in the billet 22.

During the formation of flat portions 23a in the billet 22, the flat portion 23a corresponding to the pin equivalent portion to be located at the second position L2 (which will hereinafter be referred to as a "second position pin equivalent portion" and denoted by "PA2") is decentered along the pressing direction. In this way, an initial blank 23 is obtained, and in the initial blank 23, volume has been distributed by the pressings of the pin equivalent portions and the journal equivalent portions. In the initial blank 23, also, the second position pin equivalent portion has been decentered. For example, the first preforming step can be executed following a process flow as will be descried later.

In the second preforming step, for further volume distribution, the initial blank 23 is pressed by a second pair of dies. The pressing direction in this step is a direction perpendicular to the decentering direction of the second position pin equivalent portion PA2. Thereby, an intermediate blank 24 is obtained. In the intermediate blank 24, the pin equivalent portion PA1 to be located at the first position L1 (which will hereinafter be referred to as a "first position pin equivalent portion") is decentered along the pressing direction. The pin equivalent portion PA3 to be located at the third position L3 (which will hereinafter be referred to as a "third position pin equivalent portion") is decentered along the pressing direction to a side opposite to the first position pin equivalent portion PA1. In the intermediate blank 24, the phase difference between the first position pin equivalent portion PA1 and the second position pin equivalent portion PA2 is 90 degrees. The phase difference between the first position pin equivalent portion PA1 and the third position pin equivalent portion PA3 is 180 degrees. The details of the second preforming step will be described later.

In the final preforming step, the intermediate blank 24 is pressed by a third pair of dies. The direction of the pressing by the third pair of dies may be a direction perpendicular to the decentering direction of the second position pin equivalent portion PA2. Thereby, the first position pin equivalent portion PA1 and the third position pin equivalent portion PA3 are further decentered, and a final blank 25 is obtained. During the pressing, the phase differences among the first position to the third position pin equivalent portions PA1 to PA3 are kept the same. The final blank 25 is roughly in the form of a crankshaft shape. In the final preforming step, for example, the forming apparatus disclosed by WO2014/091730 (which will hereinafter be referred to as Patent Literature 4) may be used. An exemplary process flow of the final preforming step will be described later.

In the finish forging step, pressing is performed by a pair of dies with the decentering direction of the second position pin equivalent portion PA2 set as the pressing direction, and thereby, a finish forged blank 26 is obtained from the final blank 25. In this step, excess material flows out, and flash B is formed. The finish forged blank 26 has a shape in agreement with the shape of the finished crankshaft. As mentioned above, the final blank 25 is roughly in the form of a crankshaft shape, and in the final blank 25, the first position to the third position pin equivalent portions PA1 to PA3 have been decentered. This decreases the outflow of material in the finish forging step, which minimizes the flash B formed in the finish forging step.

In the finish forging step of this exemplary production process, for adjustment of the placement angles of the pins, the first position pin equivalent portion PA1 is offset along the pressing direction to the side opposite to the second position pin equivalent portion PA2 and thereby placed in the first pin position L1 of the finished crankshaft. Also, the third position pin equivalent portion PA3 is offset along the pressing direction to the side opposite to the second position pin equivalent portion PA2 and thereby placed in the third pin position L3 of the finished crankshaft. In this way, the pins P1 to P3 are placed in positions having phase differences of 120 degrees.

In the trimming step, for example, while the finish forged blank 26 with flash is held in a pair of dies, the flash B is cut out by a cutting die. Thus, the flash B is removed from the finish forged blank 26. Then, a forged crankshaft 21 (final product) is obtained.

Patent Literature 4 suggests a forming apparatus that forms a rough blank that is roughly in the form of a crankshaft shape into a blank for finish forging. The rough blank is obtained by applying reduction rolling and bending to a round billet repeatedly. Then, after the blank for finish forging is formed, finish forging and trimming are applied sequentially to the blank for finish forging.

The production method according to the present embodiment differs from the production process disclosed in Patent Literature 4 in the step of obtaining a rough blank from a billet. Specifically, the production method according to the present embodiment does not include a step of applying reduction rolling and bending repeatedly to the billet, and instead includes the first preforming step and the second preforming step. The final preforming step in the production method according to the present embodiment corresponds to the processing performed by the forming apparatus disclosed in Patent Literature 4, that is, corresponds to the formation of a blank for finish forging from a rough blank. In the method according to the present embodiment, moreover, finish forging and trimming are sequentially applied to the final blank (corresponding to the blank for finish forging in Patent Literature 4).

The finish forging step in the production method according to the present embodiment and the finish forging step in the production method disclosed in Patent Literature 4 correspond to the die forging step in the conventional production process described with reference to FIGS. 2A to 2F. In the conventional production process, the die forging step includes rough forging and finish forging. On the other hand, in the production method according to the present embodiment and in the production method disclosed in Patent Literature 4, the die forging step includes only finish forging.

2. Exemplary Process Flow of First Preforming Step

Figure 4A:
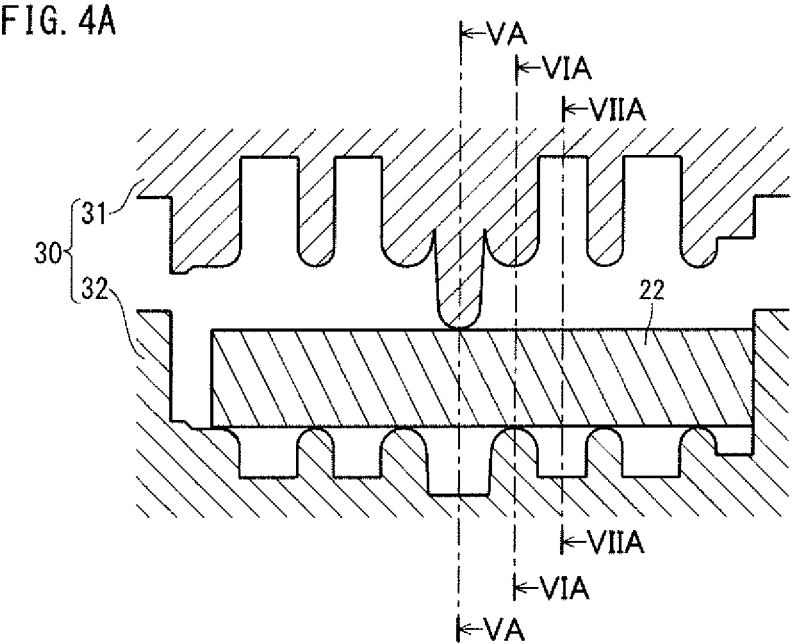
FIG. 4A is a longitudinal sectional view showing a state at the start of pressing in an exemplary process flow of a first preforming step.
Figure 4B:
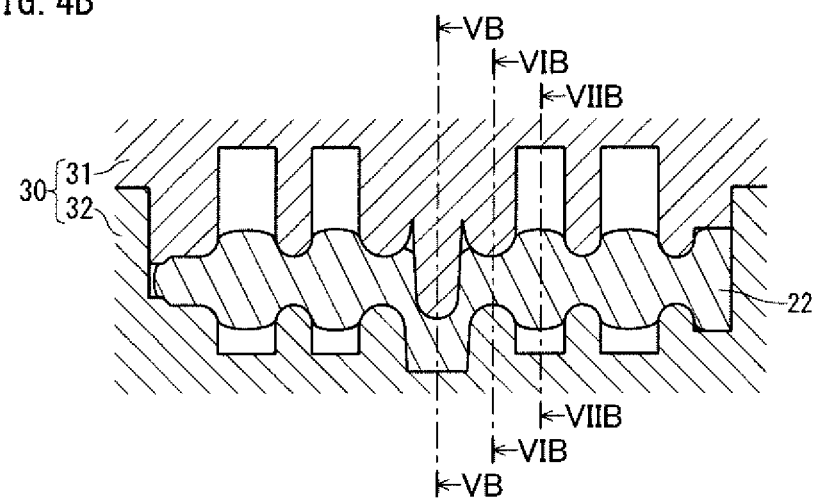
FIG. 4B is a longitudinal sectional view showing a state at the completion of pressing in the exemplary process flow of the first preforming step.

FIGS. 4A to 7B are diagrams showing an exemplary process flow of the first preforming step. FIG. 4A is a longitudinal sectional view showing a state at the start of pressing, and FIG. 4B is a longitudinal sectional view showing a state at the completion of pressing.

Figure 5A:
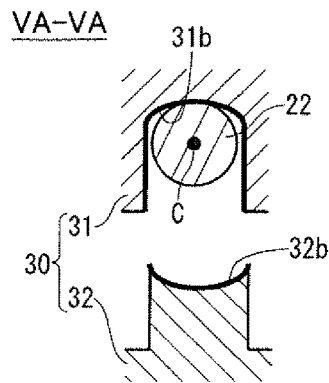
FIG. 5A is a cross-sectional view of a portion to be formed into a pin located at a second position at the start of pressing in the exemplary process flow of the first preforming step.
Figure 5B:
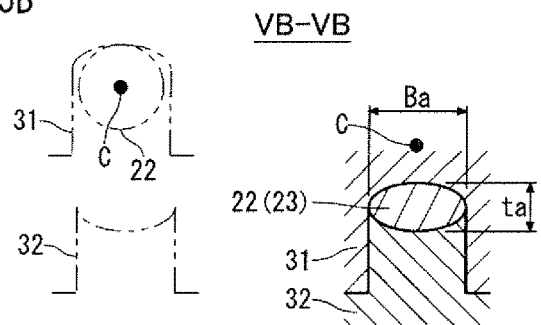
FIG. 5B is a cross-sectional view of the portion to be formed into the pin located at the second position at the completion of pressing in the exemplary process flow of the first preforming step.

FIGS. 5A and 5B are cross-sectional views of a portion to be formed into a pin located at the second position (second position pin equivalent portion). FIG. 5A shows a state at the start of pressing, and FIG. 5B shows a state at the completion of pressing. FIG. 5A is a sectional view along the line VA-VA in FIG. 4A, and FIG. 5B is a sectional view along the line VB-VB in FIG. 4B.

Figure 6A:
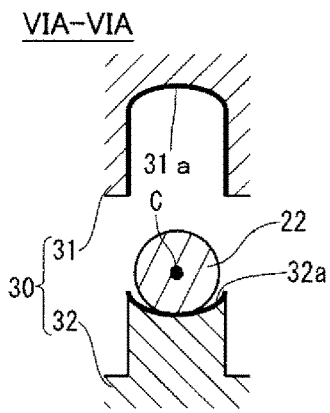
FIG. 6A is a cross-sectional view of a portion to be formed into a journal at the start of pressing in the exemplary process flow of the first preforming step.
Figure 6B:
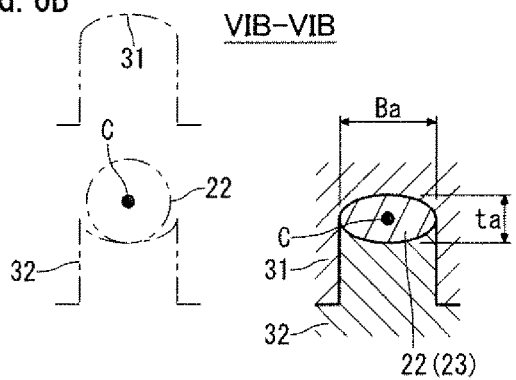
FIG. 6B is a cross-sectional view of the portion to be formed into a journal at the completion of pressing in the exemplary process flow of the first preforming step.

FIGS. 6A and 6B are cross-sectional views of a portion to be formed into a journal (journal equivalent portion). FIG. 6A shows a state at the start of pressing, and FIG. 6B shows a state at the completion of pressing. FIG. 6A is a sectional view along the line VIA-VIA in FIG. 4A, and FIG. 6B is a sectional view along the line VIB-VIB in FIG. 4B.

Figure 7A:
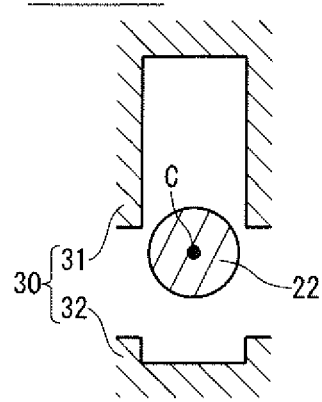
FIG. 7A is a cross-sectional view of the portion to be formed into an arm incorporating a weight at the start of pressing in the exemplary process flow of the first preforming step.
Figure 7B:
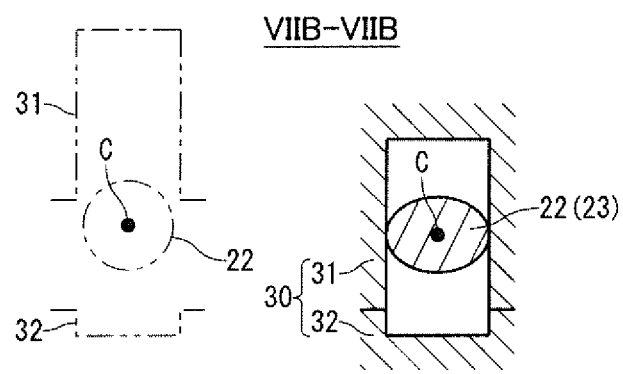
FIG. 7B is a cross-sectional view of the portion to be formed into an arm incorporating a weight at the completion of pressing in the exemplary process flow of the first preforming step.

FIGS. 7A and 7B are cross-sectional views of a portion to be formed into an arm incorporating a weight. FIG. 7A shows a state at the start of pressing, and FIG. 7B shows a state at the completion of pressing. FIG. 7A is a sectional view along the line VIIA-VIIA in FIG. 4A, and FIG. 7B is a sectional view along the line VIIB-VIIB in FIG. 4B. The "portion to be formed into an arm incorporating a weight" includes a portion to be formed into the weight integrated with the arm. A portion to be formed into an arm and a portion to be formed into a weight integrated with the arm will hereinafter be referred to as a "web equivalent portion".

In FIGS. 4A to 7B, a billet 22 that is circular in cross section, and a first pair of dies 30 are shown. The first pair of dies 30 includes a first upper die 31 and a first lower die 32. For easy understanding of the drawings, in FIGS. 5A to 7B, the axis position of the journal equivalent portion is indicated by a black circle (see reference symbol C). In FIGS. 5B, 6B and 7B, the first upper die 31, the first lower die 32 and the billet 22 at the start of pressing are indicated by two-dot chain lines. The first pair of dies 30 includes pin processing portions to come into contact with pin equivalent portions, and journal processing portions to come into contact with journal equivalent portions.

In this exemplary process flow, as indicated by the heavy lines in FIG. 5A, each of the pin processing portions includes a first pin processing part 31b provided in one of the first pair of dies, and a second pin processing part 32b provided in the other of the third pair of dies. The first pin processing part 31b is recessed and is capable of housing a billet 22. In this process flow, the pin processing part provided in the upper die 31 is recessed and is capable of housing a billet 22, that is, the first pin processing part 31b. The pin processing part provided in the lower die 32 is the second pin processing part 32b, and the second pin processing part 32b is located on the edge surface of a raised portion. There is no limit as to which of the upper die and the lower die includes such recessed processing parts that are capable of housing a billet (first pin processing parts). Accordingly, the lower die may include recessed processing parts that are capable of housing a billet (first pin processing parts).

The pin processing portions to come into contact with the first position pin equivalent portion and the third position pin equivalent portion, respectively, have the same structure as that of the pin processing portion to come into contact with the second position pin equivalent portion shown in FIGS. 5A and 5B, though no cross-sectional views of these pin processing portions are not given. However, the pin processing portions to come into contact with the first position pin equivalent portion and the third position pin equivalent portion, respectively, differ from the pin processing portion to come into contact with the second position pin equivalent portion in the position in the pressing direction (see FIGS. 4A and 4B).

In this exemplary process flow, as indicated by the heavy lines in FIG. 6A, each of the journal processing portions includes a first journal processing part 31a provided in one of the first pair of dies, and a second journal processing part 32a provided in the other of the first pair of dies. The first journal processing part 31a is recessed and is capable of housing a billet 22. In this process flow, the journal processing part provided in the upper die 31 is recessed and is capable of housing a billet 22, that is, the first journal processing part 31a. The journal processing part provided in the lower die 32 is the second journal processing part 32a, and the second journal portions 32a is located on the edge surface of a raised portion. There is no limit as to which of the upper die and the lower die includes such recessed processing parts that are capable of housing a billet (first journal processing parts). Accordingly, the lower die may include recessed processing parts that are capable of housing a billet (first journal processing parts).

In the exemplary process flow of the first preforming step, the upper die 31 is moved up and is separated from the lower die 32, and the billet 22 is placed between the upper die 31 and the lower die 32. Then, when the upper die 31 is moved down, the pin equivalent portions of the billet 22 are housed in the respective recessed first pin processing parts 31b as shown in FIG. 5A, and the journal equivalent portions of the billet 22 are housed in the respective recessed first journal processing parts 31a as shown in FIG. 6A. When the upper die 31 is moved further down, the billet 22 is pressed by the pin processing parts 31b and 32b and by the journal processing parts 31a and 32a, and the sectional areas of the pin equivalent portions and the journal equivalent portions are decreased. Then, flat portions as shown in FIGS. 5B and 6B are formed.

As shown in FIG. 4A, the pin processing portion for the second position pin equivalent portion differs from the pin processing portions for the first position and the third position pin equivalent portions in the position in the pressing direction. Accordingly, the second position pin equivalent portion is deformed and decentered in the pressing direction. After completion of the pressing by the first pair of dies 30, the upper die 31 is moved up, and the processed billet 22 (initial blank 23) is taken out.

In such a process flow, while the pin equivalent portions and the journal equivalent portions are pressed, the material of the pin equivalent portions and the journal equivalent portions flows in the axial direction of the billet 22 and flows into portions to be formed into arms without a weight (which will hereinafter be referred to as "non-weight arm equivalent portions") and the web equivalent portions. Then, in the obtained initial blank 23, the volume has been distributed in the axial direction. Additionally, the second position pin equivalent portion has been decentered.

In the process flow of the first preforming step, as the upper die is being moved down, the holes of the recessed first pin processing parts 31b are closed by the second pin processing parts 32b, and the first and the second pin processing parts form closed cross-sections (see FIGS. 5A and 5B). Also, the holes of the recessed first journal processing parts 31a are closed by the second journal processing parts 32a, and the first and the second journal processing parts form closed cross-sections (see FIGS. 6A and 6B). This prevents the material from flowing in between the upper die 31 and the lower die 32 and accordingly prevents formation of flash. This improves the material yield rate and facilitates volume distribution in the axial direction.

In the forged crankshaft production method according to the present embodiment, the outflow of material and the formation of flash may be prevented by partial pressing of the journal equivalent portions by the journal processing portions as will be described later. Also, the outflow of material and the formation of flash may be prevented by partial pressing of the pin equivalent portions by the pin processing portions.

In the preforming step, with a view to facilitating the volume distribution in the axial direction, the web equivalent portions are not required to be pressed by the first pair of dies. With a view to adjusting the shapes (dimensions) of the web equivalent portions, the web equivalent portions may be partly pressed by the first pair of dies (see FIGS. 7A and 7B).

Also, the non-weight arm equivalent portions may be partly pressed by the first pair of dies for adjustment of the shapes (dimensions) thereof.

The cross-sectional shape of each of the flat portions only needs to have a width (dimension in a direction perpendicular to the pressing direction) Ba greater than a thickness ta (dimension in the pressing direction), and may be elliptic or oval, for example (see FIGS. 5B and 6B).

3. Exemplary Process Flow of Second Preforming Step

Figure 8A:
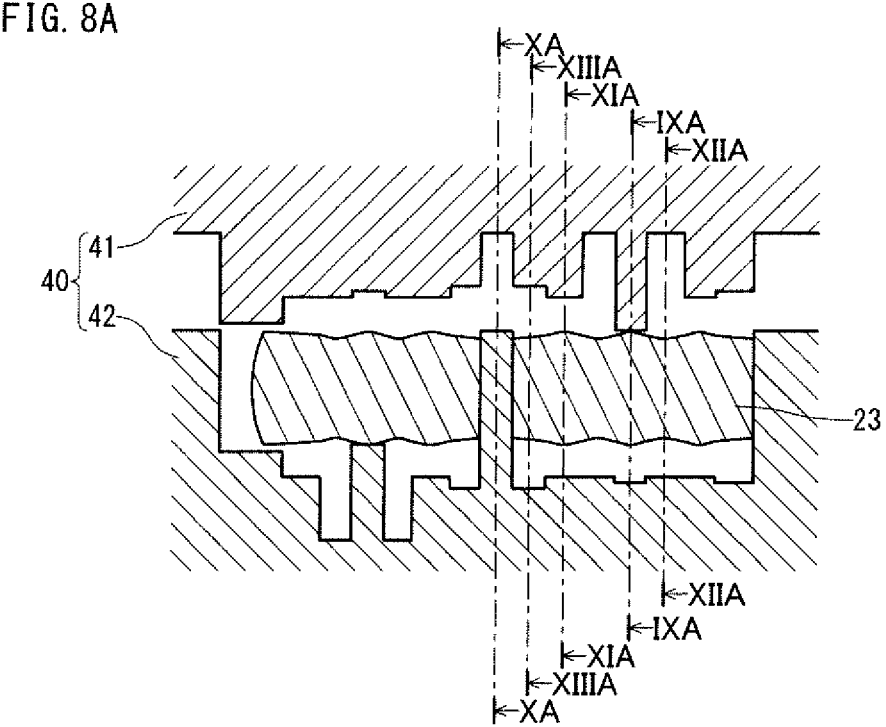
FIG. 8A is a longitudinal sectional view showing a state at the start of pressing in an exemplary process flow of the second preforming step.
Figure 8B:
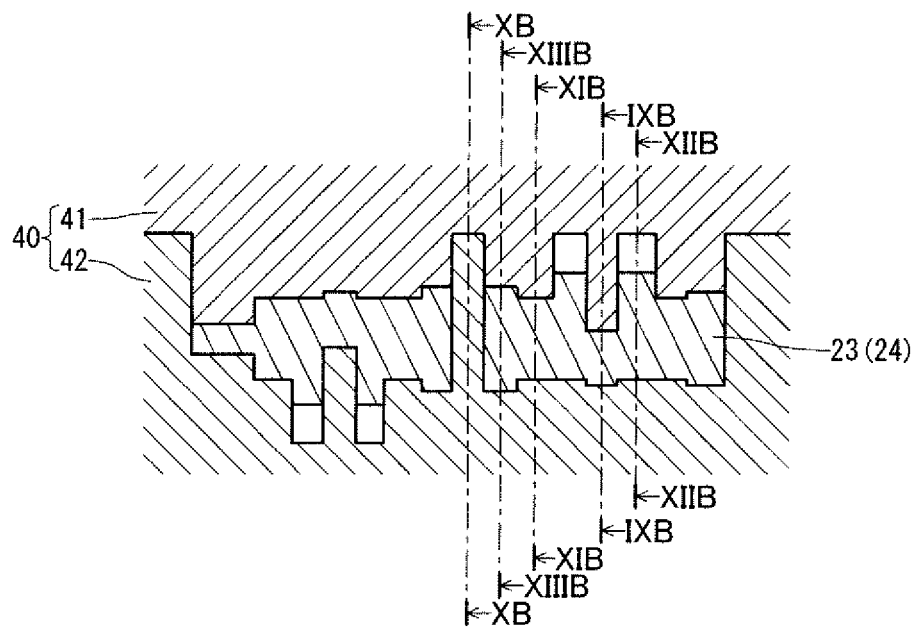
FIG. 8B is a longitudinal sectional view showing a state at the completion of pressing in the exemplary process flow of a second preforming step.

FIGS. 8A to 13B are diagrams showing an exemplary process flow of the second preforming step. FIG. 8A is a longitudinal sectional view showing a state at the start of pressing, and FIG. 8B is a longitudinal sectional view showing a state at the completion of pressing.

Figure 9A:
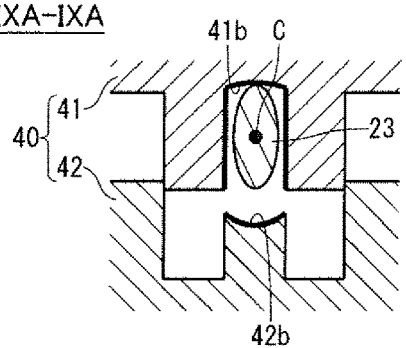
FIG. 9A is a cross-sectional view of a portion to be formed into a pin located at a third position at the start of pressing in the exemplary process flow of the second preforming step.
Figure 9B:
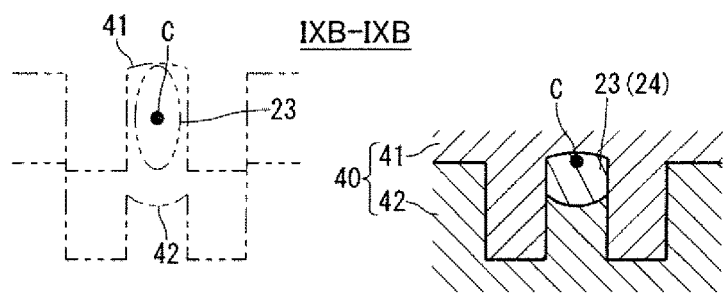
FIG. 9B is a cross-sectional view of the portion to be formed into the pin located at the third position at the completion of pressing in the exemplary process flow of the second preforming step.

FIGS. 9A and 9B are sectional views of the portion to be formed into the pin located at the third position (third position pin equivalent portion). FIG. 9A shows a state at the start of pressing, and FIG. 9B shows a state at the completion of pressing. FIG. 9A is a sectional view along the line IXA-IXA in FIG. 8A, and FIG. 9B is a sectional view along the line IXB-IXB in FIG. 8B.

Figure 10A:
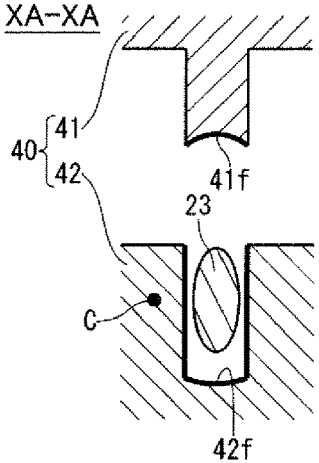
FIG. 10A is a cross-sectional view of the portion to be formed into the pin located at the second position at the start of pressing in the exemplary process flow of the second preforming step.
Figure 10B:
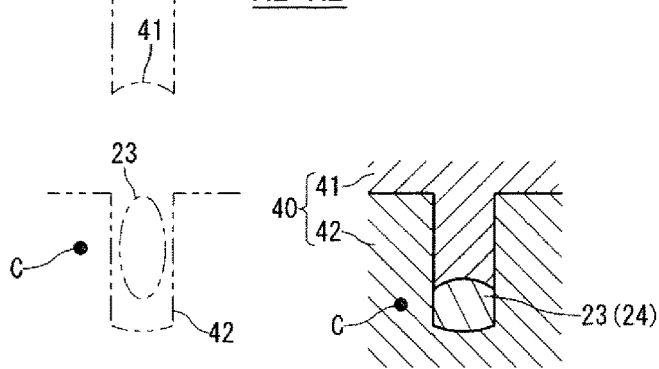
FIG. 10B is a cross-sectional view of the portion to be formed into the pin located at the second position at the completion of pressing in the exemplary process flow of the second preforming step.

FIGS. 10A and 10B are cross-sectional views of the portion to be formed into the pin located at the second position (second position pin equivalent portion). FIG. 10A shows a state at the start of pressing, and FIG. 10B shows a state at the completion of pressing. FIG. 10A is a sectional view along the line XA-XA in FIG. 8A, and FIG. 10B is a sectional view along the line XB-XB in FIG. 8B.

Figure 11A:
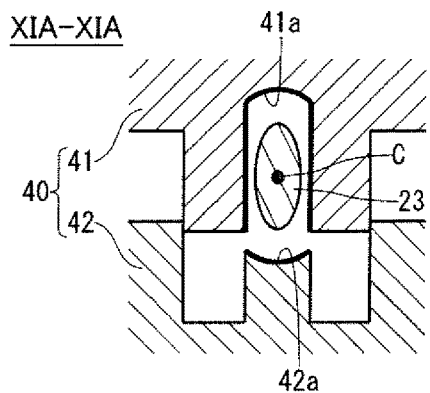
FIG. 11A is a cross-sectional view of a portion to be formed into a journal at the start of pressing in the exemplary process flow of the second preforming step.
Figure 11B:
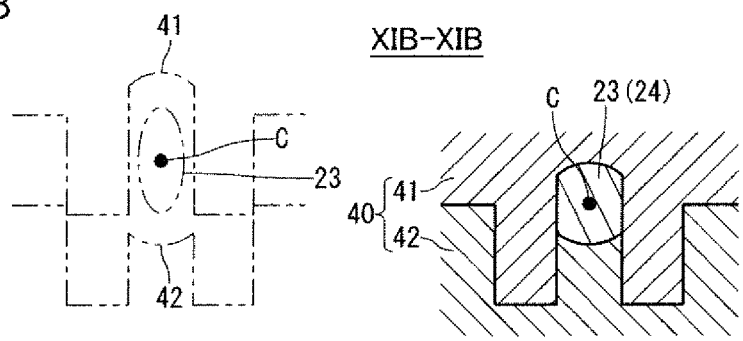
FIG. 11B is a cross-sectional view of the portion to be formed into a journal at the completion of pressing in the exemplary process flow of the second preforming step.

FIGS. 11A and 11B are cross-sectional views of a portion to be formed into a journal (journal equivalent portion). FIG. 11A shows a state at the start of pressing, and FIG. 11B shows a state at the completion of pressing. FIG. 11A is a sectional view along the line XIA-XIA in FIG. 8A, and FIG. 11B is a sectional view along the line XIB-XIB in FIG. 8B.

Figure 12A:
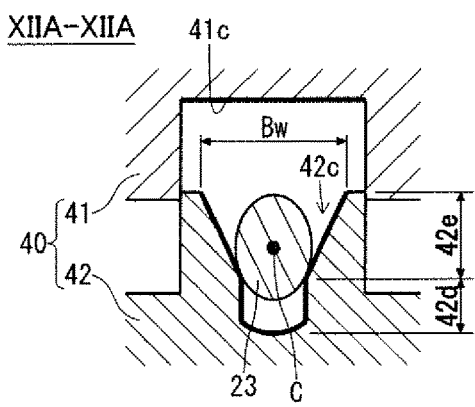
FIG. 12A is a cross-sectional view of a portion to be formed into an arm incorporating a weight at the start of pressing in the exemplary process flow of the second preforming step.
Figure 12B:
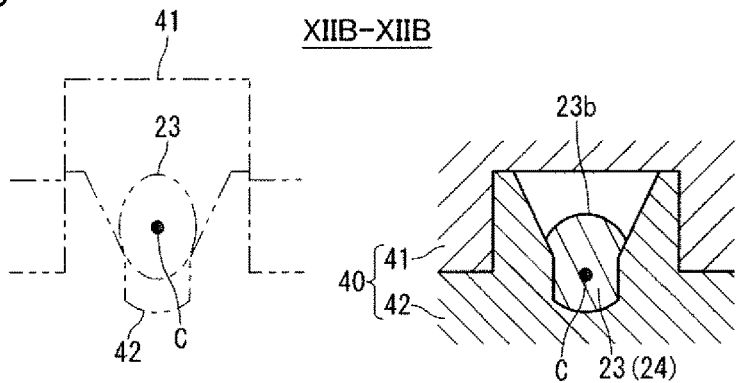
FIG. 12B is a cross-sectional view of the portion to be formed into an arm incorporating a weight at the completion of pressing in the exemplary process flow of the second preforming step.

FIGS. 12A and 12B are sectional views of a portion to be formed into an arm incorporating a weight (web equivalent portion). FIG. 12A shows a state at the start of pressing, and FIG. 12B shows a state at the completion of pressing. FIG. 12A is a sectional view along the line XIIA-XIIA in FIG. 8A, and FIG. 12B is a sectional view along the line XIIB-XIIB in FIG. 8B.

Figure 13A:
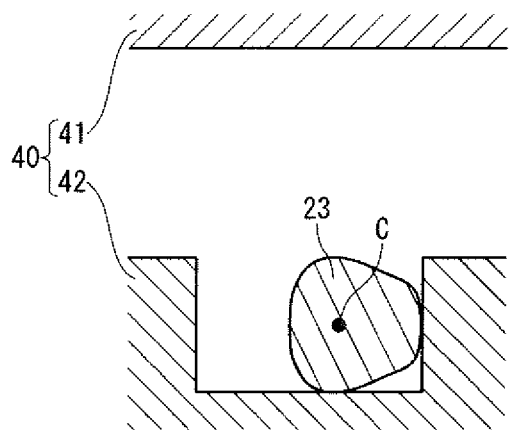
FIG. 13A is a cross-sectional view of a portion to be formed into an arm without a weight at the start of pressing in the exemplary process flow of the second preforming step.
Figure 13B:
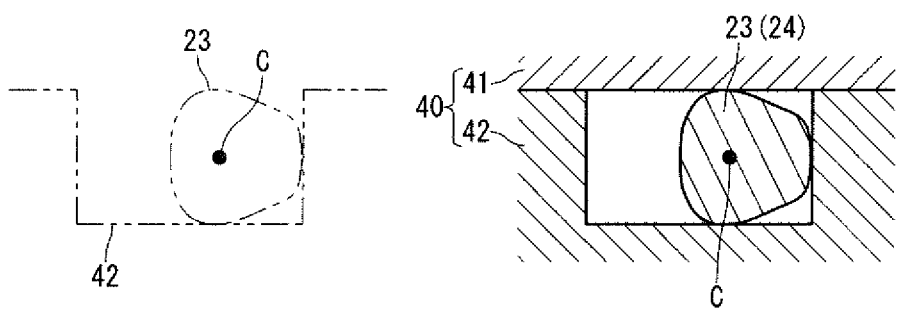
FIG. 13B is a cross-sectional view of the portion to be formed into an arm without a weight at the completion of pressing in the exemplary process flow of the second preforming step.

FIGS. 13A and 13B are sectional views of a portion to be formed into an arm without a weight (non-weight arm equivalent portion). FIG. 13A shows a state at the start of pressing, and FIG. 13B shows a state at the completion of pressing. FIG. 13A is a sectional view along the line XIIIA-XIIIA in FIG. 8A, and FIG. 13B is a sectional view along the line XIIIB-XIIIB in FIG. 8B.

In FIGS. 8A to 13B, the initial blank 23 obtained by the first preforming step, and a second pair of dies 40 are shown. The second pair of dies 40 includes a second upper die 41 and a second lower die 42. For easy understanding of the drawings, in FIGS. 9A to 13B, the axis position of the journal equivalent portion is indicated by a black circle (see reference symbol C). In FIGS. 9B, 10B, 11B, 12B and 13B, the second upper die 41, the second lower die 42 and the initial blank 23 at the start of pressing are indicated by two-dot chain lines. The second pair of dies 40 includes pin processing portions including parts 41$b$, 42$b$, 41$f$ and 42$f$ to come into contact with the pin equivalent portions of the initial blank 23, and journal processing portions including parts 41$a$ and 42$a$ to come into contact with the journal equivalent portions, and web processing portions including parts 41$c$ and 42$c$ to come into contact with the web equivalent portions.

In this exemplary process flow, each of the pin processing portions includes a first pin processing part 41$b$ or 42$f$ provided in one of the first dies 41 and 42, and a second pin processing part 42$b$ or 41$f$ provided in the other of the first dies (see the heavy lines in FIGS. 9A and 10A). The first pin processing parts 41$b$ and 42$f$ are each recessed and capable of entirely housing a flat portion of the initial blank 23. There is no limit as to, in each of the pin processing portions, which of the pin processing part provided in the upper die and the pin processing part provided in the lower die is a recessed part capable of entirely housing a flat portion of the initial blank (first pin processing part).

In the exemplary process flow, for the third position pin equivalent portion, as indicated by the heavy line in FIG. 9A, the pin processing part provided in the upper die 41 is a recessed and is capable of housing a flat portion of the initial blank 23, that is, the first pin processing part 41$b$. Also, the pin processing part provided in the lower die 42 is the second pin processing part 42$b$, and the second pin processing part 42$b$ is located on the edge surface of a raised portion. On the other hand, for the second position pin equivalent portion, as indicated by the heavy lines in FIG. 10A, the pin processing part provided in the lower die 42 is the recessed first pin processing part 42$f$, and the pin processing part provided in the upper die 41 is the second pin processing part 41$f$.

The pin processing portion for the second position pin equivalent portion shown in FIGS. 10A and 10B differs from the pin processing portion for the third position pin equivalent portion in the position in the pressing direction and in the position in a direction perpendicular thereto (decentering direction of the second position pin equivalent portion). The pin processing portion for the first position pin equivalent portion (of which cross-sectional view is not presented) differs from the pin processing portion for the third position pin equivalent portion in the position in the pressing direction.

In this exemplary process flow, as indicated by the heavy lines in FIG. 11A, each of the journal processing portions includes a first journal processing part 41$a$ provided in one of the second dies 41 and 42, and a second journal processing part 42$a$ provided in the other of the second dies. The first journal processing part 41$a$ is recessed and is capable of entirely housing a flat portion of the initial blank 23. In this exemplary process flow, the journal processing part provided in the upper die 41 is a recessed portion that is capable of entirely housing a flat portion of the initial blank 23, that is, the first journal processing part 41$a$. The journal processing part provided in the lower die 42 is the second journal processing part 42$a$, and the second journal processing part 42$a$ is located on the edge surface of a raised portion. There is no limit as to which of the upper die and the lower die includes such recessed journal processing parts each of which is capable of entirely housing a flat portion of the initial blank (first journal processing parts). Accordingly, the lower die may include recessed parts each of which is capable of entirely housing a flat portion of the initial blank (first journal processing parts).

In each of the web processing portions, as indicated by the heavy lines in FIG. 12A, one of the upper die 41 and the lower die 42 has a generally concave cross-sectional shape. In this exemplary process flow, in each of the web processing portions, the lower web processing part 42$c$ is wholly recessed, and the other (upper) web processing part 41$c$ is flat. Which of the upper die and the lower die includes recessed web processing parts can be determined according to the shape of the forged crankshaft to be produced.

The recessed web processing part 42$c$ (provided in the lower die in the case of FIG. 12A) includes an arm processing part 42$d$ to come into contact with a portion to be formed into an arm (which will hereinafter be referred to as an "arm equivalent portion"), and a weight processing part 42$e$ to come into contact with a portion to be formed into a weight (which will hereinafter be referred to as a "weight equivalent portion"). The arm processing part 42$d$ occupies the bottom side of the recessed web processing part 42$c$, and the weight processing part 42$e$ occupies the open side of the recessed web processing part 42$c$. The width Bw of the open side of the weight processing part 42$e$ becomes greater with increasing distance from the bottom of the recessed web processing part. In this process flow, as shown in FIG. 12A, both sides of the weight processing part 42e are inclined surfaces. Both sides of the arm processing part 42d are parallel surfaces, and accordingly, the width Bw of the open side of the arm processing part 42d is constant.

In this exemplary process flow of the second preforming step, each of the web equivalent portions is processed to have a thickness t1 greater than a finished size t0 (see FIGS. 3C and 3F). For this purpose, the web processing parts 41c and 42c are designed to have a length (dimension in the axial direction) greater than that of a finished arm incorporating a weight. The finished size t0 means the thickness of the arms and weights of the forged crankshaft (final product).

In the process flow of the second preforming step using the second pair of dies 40, the upper die 41 is moved up and separated from the lower die 42, and the initial blank 23 is placed between the upper die 41 and the lower die 42. In this regard, the initial blank 23 is rotated 90 degrees around the axis from the state at the completion of the first preforming step (the billet) around the axis, and then placed between the dies 41 and 42. Accordingly, the direction of the pressing by the second pair of dies 40 is a direction perpendicular to the decentering direction of the second position pin equivalent portion.

Then, the upper die 41 is moved down, and as shown in FIGS. 9A, 10A and 11A, the flat portions of the initial blank 23 are housed in the recessed first journal processing parts 41a and the recessed first pin processing parts 41b and 42f. At this time, as shown FIG. 12A, each of the web equivalent portions is mostly placed in the weight processing part 42e without contacting the bottom of the web processing part.

When the upper die 41 is moved further down, the first pin processing parts 41b and 42f, and the second pin processing parts 42b and 41f form closed cross-sections. Also, the first journal processing parts 41a and the second journal processing parts 42a form closed cross-sections. Then, when the upper die 41 is moved further down to the bottom dead point, the flat portions in the spaces enclosed by the first pin processing parts 41b and 42f and the second pin processing parts 42b and 41f are pressed thereby. Also, the flat portions in the spaces enclosed by the first journal processing parts 41a and the second journal processing parts 42a are pressed thereby. In this way, the flat portions of the initial blank 23 are pressed by the second pair of dies, and the sectional areas of the journal equivalent portions and the pin equivalent portions are decreased. At the same time, excess material flows in the axial direction into the web equivalent portions, and thus, volume distribution is progressed.

Also, the first position pin equivalent portion is decentered along the pressing direction, and the third position pin equivalent portion is decentered along the pressing direction to the side opposite to the first position pin equivalent portion.

Each of the web equivalent portions is pushed into the bottom side of the recessed web processing part 42c without being pressed by the other web processing part 41c (web processing part provided in the upper die in the case of FIGS. 12A and 12B). The pushing arises along with the decentering of the first position pin equivalent portion and the third position pin equivalent portion located in the front side and the rear side, respectively, of the web equivalent portion. At the time of pushing, the web equivalent portion deforms along the arm processing part 42d and the weight processing part 42e. Thereby, the width of the web equivalent portion becomes smaller in the portion located in the bottom side of the recessed processing part (arm equivalent portion) and becomes greater in the portion located in the open side of the recessed processing part (weight equivalent portion). Also, the open-side surface 23b of the web equivalent portion becomes arc-shaped in cross section.

After the completion of pressing by the second pair of dies 40, the upper die 41 is moved up, and a processed initial blank 23 (intermediate blank 24) is taken out.

In the second preforming step, as described above, the first position pin equivalent portion and the third position pin equivalent portion can be decentered with no flash formed. Also, since the material flows from the pin equivalent portions to the web equivalent portions, the volume can be distributed in the axial direction. Further, by causing the material to flow from the journal equivalent portions to the web equivalent portions as needed, the volume distribution in the axial direction can be further progressed.

The non-weight arm equivalent portions may be partly pressed by the second pair of dies 40 for adjustment of the shapes and the dimensions thereof (see FIGS. 13A and 13B). Alternatively, when the material should be caused to flow to the non-weight arm equivalent portions, the non-weight arm equivalent portions shall not be pressed by the second pair of dies 40.

4. Exemplary Process Flow of Final Preforming Step

Figure 14A:
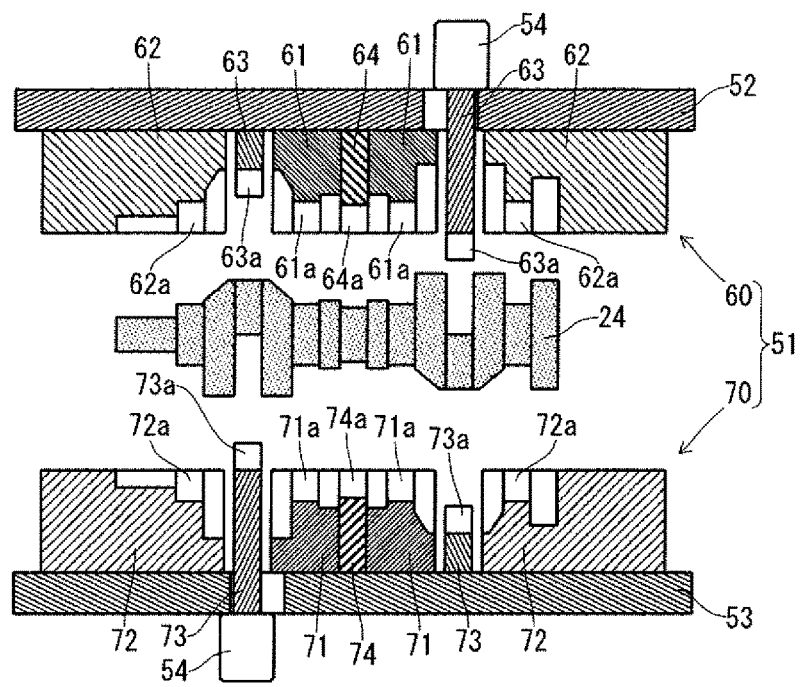
FIG. 14A is a longitudinal sectional view showing a state before pressing in an exemplary process flow of a final preforming step.
Figure 14B:
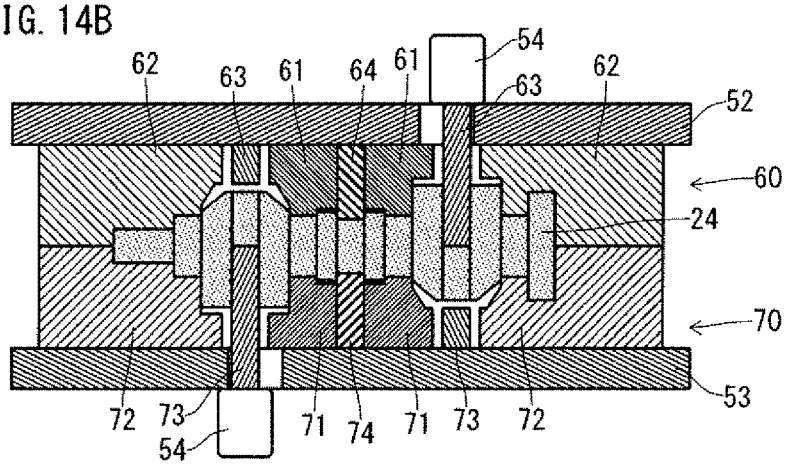
FIG. 14B is a longitudinal sectional view showing a state where an upper die has reached the bottom dead point in the exemplary process flow of the final preforming step.
Figure 14C:
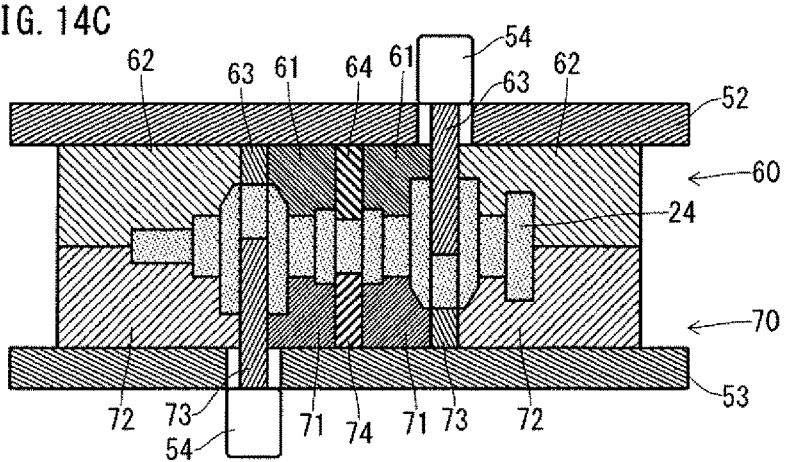
FIG. 14C is a longitudinal view showing a state at the completion of an axial movement in the exemplary process flow of the final preforming step.

FIGS. 14A to 14C are longitudinal sectional views schematically showing an exemplary process flow of the final preforming step. FIG. 14A shows a state before pressing, FIG. 14B shows a state where the upper die has reached the bottom dead point, and FIG. 14C shows a state at the completion of an axial movement. The second position pin equivalent portion is actually located in front of or behind the first position pin equivalent portion and the third position pin equivalent portion. In FIGS. 14A to 14C, however, the first to the third position pin equivalent portions are drawn in the same plane.

In FIGS. 14A to 14C, the intermediate blank 24 obtained by the second preforming step, a third pair of dies 51, an upper plate 52 and a lower plate 53 are shown. The third pair of dies 51 includes a third upper die 60 and a third lower die 70. The third upper die 60 is held by the upper plate 52, and the upper plate 52 moves up and down along with operation of a pressing machine (not shown). The third lower die 70 is held by the lower plate 53, and the lower plate 53 is fixed to the pressing machine (not shown).

In order to press the web equivalent portions (portions to be formed into arms and portions to be formed into weights integrated with the arms) in the axial direction of the intermediate blank 24, the third upper die 60 and the third lower die 70 are each composed of some components. The components of the third upper die 60 are arranged in the axial direction of the intermediate blank 24, and the components of the third lower die 70 are arranged in the axial direction of the intermediate blank 24. The third upper die 60 includes a fixed pin die component 64, fixed journal die components 61, movable journal die components 62 and movable pin die components 63. The third lower die 70 includes a fixed pin die component 74, fixed journal die components 71, movable journal die components 72 and movable pin die components 73.

The fixed pin die components 64 and 74 are to press the central pin equivalent portion (second position pin equivalent portion) of the intermediate blank 24, and are not movable in the axial direction. The fixed journal die components 61 and 71 are located in front of and in back of the fixed pin die components 64 and 74 with respect to the axial direction, and are not movable in the axial direction. The fixed journal die components 61 and 71 are to press the non-weight arm equivalent portions connected to the central pin equivalent portion, the journal equivalent portions connected to the non-weight arm equivalent portions and the web equivalent portions connected to the journal equivalent portions.

The movable journal die components 62 and 72 form some pairs of die components and are movable in the axial direction. The third upper die 60 and the third lower die 70 shown in FIGS. 14A to 14C include two pairs of movable journal die components 62 and 72. One of the pairs is to press the front equivalent portion, the first journal equivalent portion and the first web equivalent portion (first arm equivalent portion). The other is to press the sixth web equivalent portion (sixth arm equivalent portion), the fourth journal equivalent portion and the flange equivalent portion.

The movable pin die components 63 and 73 form some pairs of die components and are movable in the axial direction. The movable pin die components 63 and 73 form two pairs of die components that are to press the first position pin equivalent portion and the third position pin equivalent portion (the pin equivalent portions other than the central pin equivalent portion), respectively. Moreover, in order to decenter the first position pin equivalent portion and the third position pin equivalent portion, either the movable pin die components 63 of the upper die 60 or the movable pin die components 73 of the lower die 70 are movable in a direction perpendicular to the axial direction relative to the plate 52 or 53 holding the die components. The direction of the relative movement is along the pressing direction. The relative movement can be made by a hydraulic cylinder 54, for example. It is determined according to the shape of the forged crankshaft to be produced, which are relatively movable, the movable pin die components 63 of the upper die 60 or the movable pin die components 73 of the lower die 70.

The third upper die 60 and the third lower die 70 formed by such components each have impressions (see reference symbols 61a, 62a, 63a, 71a, 72a, 73a and 74a in FIG. 14A). The impressions reflect the approximate shape of the crankshaft (final product).

In the final preforming step, the upper die 60 is moved up, and the intermediate blank 24 is placed between the upper die 60 and the lower die 70 (see FIG. 14A). In this regard, the posture of the intermediate blank 24 is adjusted such that the pressing direction will be perpendicular to the decentering direction of the second position pin equivalent portion. Next, the upper die 60 is moved down, and the intermediate blank 24 is pressed by the upper die 60 and the lower die 70 (see FIG. 14B). Thereby, the journal equivalent portions, the second position pin equivalent portion and the non-weight arm equivalent portion of the intermediate blank 24 are pressed and formed into approximate shapes of those of the crankshaft.

While the journal equivalent portions of the intermediate blank 24 are kept pressed, the movable journal die components 62 and 72 and the movable pin die components 63 and 73 are moved in the axial direction toward the central fixed journal die components 64 and 74. The movements can be made by a wedge mechanism or a hydraulic cylinder, for example.

Along with the axial movements of the movable journal die components 62 and 72 and the movable pin die components 63 and 73, the web equivalent portions are pressed in the axial direction of the intermediate blank 24. Thereby, the web equivalent portions are formed into approximate shapes of the arms and the weights. At this time, the thickness of the web equivalent portions becomes equal to the finished size.

According to the axial movements of the movable journal die components 62 and 72 and the movable pin die components 63 and 73, either the pin die components 63 of the upper die 60 or the pin die components 73 of the lower die 70 are moved in a direction perpendicular to the axial direction. At the same time, also, the first position pin equivalent portion and the third position pin equivalent portion are further decentered along the pressing direction. At the same time, also, the first position pin equivalent portion and the third position pin equivalent portion are pressed by the movable pin die components 63 and 73, and the pin equivalent portions are formed into approximate shapes of the pins (see FIG. 14C).

After the completion of pressing by the third pair of dies 51, the upper die 60 is moved up, and a processed intermediate blank 24 (final blank) is taken out.

In the final preforming step, the first position pin equivalent portion and the third position pin equivalent portion can be decentered with no or almost no flash formed, and the intermediate blank can be formed into an approximate shape of the forged crankshaft.

In the forged crankshaft production method according to the embodiment, the second position pin equivalent portion is decentered in the first preforming step and is pressed in the first and the second preforming steps to have a decreased cross-sectional area. The first position pin equivalent portion and the third position pin equivalent portion are decentered in the second and the final preforming steps and are pressed in the first and the second preforming steps to have a decreased cross-sectional area. Consequently, in the final blank obtained through the first, the second and the final preforming steps, all of the pin equivalent portions have been decentered and have been pressed to have decreased cross-sectional areas. Accordingly, during formation of the pins in the die forging step (finish forging step) after the final preforming step, almost no flash is formed, and therefore, the material yield rate can be improved.

No flash is formed in the first and the second preforming steps, and additionally, formation of flash is inhibited in the final preforming step. For this reason also, the forged crankshaft production method according to the present invention allows facilitation of the volume distribution and an improvement of the material yield rate. All of the preforming steps can be implemented by pressing by use of a pressing machine. Thus, no special facility is required, which leads to a decrease in facility cost.

5. Thickness of Web Equivalent Portions and Volume Distribution

In the above-described process flow of the second preforming step, the web equivalent portions are processed to have a thickness greater than the finished size. Then, in the final preforming step, the web equivalent portions are pressed in the axial direction. In the forged crankshaft production method according to the present embodiment, however, the processing applied to the web equivalent portions in the second and the final preforming steps is not limited to this processing. The web equivalent portions may be processed to have a thickness equal to the finished size in the second preforming step, and the web equivalent portions of the intermediate blank shall not be pressed in the axial direction in the final preforming step.

As mentioned above, in the forged crankshaft, each of the weights greatly bulges from the arm. Therefore, in the finish die forging step, the filling of material in the weights is likely to be insufficient, thereby causing deficiency in the weights. In order to prevent the deficiency in the weights, a blank with an increased volume shall be used. However, this inevitably decreases the material yield rate. In order to avoid this, it is preferred that the web equivalent portions are processed to have a thickness greater than the finished size in the second preforming step and are pressed in the axial direction of the intermediate blank in the final preforming step. In this case, the non-weight arm equivalent portions also may be processed to have a thickness greater than the finished size in the second preforming step and may be pressed in the axial direction of the intermediate blank in the final preforming step. In this case, the fixed journal die components 61 and 71 shall be replaced with movable journal die components.

In the above-described process flow of the second preforming step, the second pair of dies having the web processing portions is used. In the forged crankshaft production method according to the present invention, however, the second preforming step is not limited to a step with this configuration. In other words, the second preforming step may be the same as the first preforming step in that the web equivalent portions are not pressed and that the material is caused to flow from the pin equivalent portions and the journal equivalent portions to the web equivalent portions.

As in the above-described process flow of the second preforming step, it is preferred that the second pair of dies having the web processing portions is used. This allows each of the web equivalent portions to be processed to have a smaller width in the arm equivalent portion and a greater width in the weight equivalent portion while facilitating the flow of material from the pin equivalent portions and the journal equivalent portions to the web equivalent portions. In short, volume distribution inside each web equivalent portion can be performed. This leads to an improvement of the degree of filling of material in the weight equivalent portions in the next final preforming step. Further, this leads to an improvement of the degree of filling of material in the weight equivalent portions in the finish forging step and minimization of flash formed in the finish forging step.

When the second pair of dies having the web processing portions is used, the volume distribution inside each of the web equivalent portions can be adjusted by changing the shape of the arm equivalent part as appropriate according to the shape of the forged crankshaft (final product). For example, by changing the width of the open side of the arm processing part or designing the arm processing part to have inclined surfaces, it is possible to change the volume of the arm equivalent portion, whereby the volume distribution inside the web equivalent portion can be adjusted. In order to permit the processed initial blank (intermediate blank) to be taken out from the second pair of dies smoothly after the completion of pressing, the arm processing part may include inclined surfaces to form a draft.

The weights of the forged crankshaft (final product) may be any of various shapes. For example, there is a case of forming each of the weights to bulge greatly in the width direction and to have a small dimension in the pin decentering direction. In order to comply with such a case, in the second preforming step, the shape of the weight processing part may be changed as appropriate such that the volume can be distributed inside the web equivalent portion appropriately in the width direction and in the pin decentering direction. The change to the shape of the weight processing part may be adjusting the angle of inclination of the inclined surfaces or designing the weight processing part to have curved surfaces, for example. Further, each of the web equivalent portions may be pressed from the open side of the recessed web processing portion for volume distribution inside the weight equivalent portion.

Figure 15A:
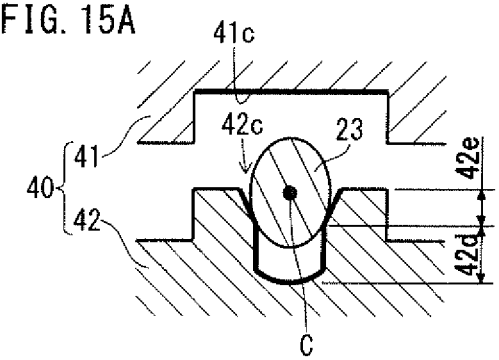
FIG. 15A is a cross-sectional view of a portion to be formed into an arm incorporating a weight showing a state before pressing in the second preforming step in a case where each portion to be formed into an arm incorporating a weight is pressed from the open side of a recessed web processing portion in the second preforming step.
Figure 15B:
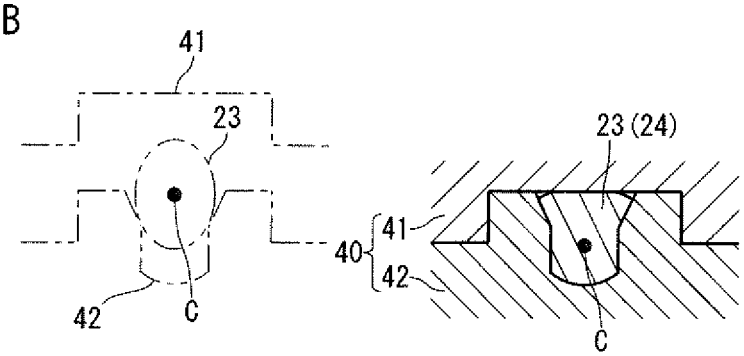
FIG. 15B is a cross-sectional view of the portion to be formed into an arm incorporating a weight showing a state at the completion of pressing in the second preforming step in a case where each portion to be formed into an arm incorporating a weight is pressed from the open side of a recessed web processing portion in the second preforming step.

FIGS. 15A and 15B are cross-sectional views of a portion to be formed into an arm incorporating a weight showing a case where each of the portions to be formed into arms incorporating a weight (the web equivalent portions) from the open side of the recessed web processing portion. FIG. 15A shows a state before pressing, and FIG. 15B shows a state at the completion of pressing. In the case shown in FIGS. 15A and 15B, the recessed web processing portion 42c shown in FIGS. 12A and 12B is modified to be shallower.

In the process flow shown in FIGS. 15A and 15B, as in the process flow shown in FIGS. 12A and 12B, each of the web equivalent portions is pushed into the bottom side of the recessed web processing part 42c and is deformed along the recessed web processing part 42c. Since the recessed web processing part 42c is shallower, at the last stage of the pressing by the second pair of dies, the flat web processing part 41c is pressed against the open side surface of the web equivalent portion. Accordingly, the web equivalent portion is pressed from the open side of the recessed web processing part 42c and is deformed to have a greater width and a smaller length. Thus, the volume is distributed inside the weight equivalent portion.

The pressing to press the web equivalent portion from the open side is preferably a light pressing so that the material can flow into the web equivalent portion without blockage. The light pressing can be performed by pressing a part of the open side surface 23b (see FIG. 12B) of the web equivalent portion. In this case, the material flows to a portion that is out of contact with the dies, thereby resulting in a light pressing.

6. Another Example of Second Preforming Step

In the above-described process flow of the second preforming step, the pin equivalent portions are pressed while closed cross-sections are formed by the first and the second pin processing parts. In the forged crankshaft production method according to the present embodiment, however, it is not necessary to form closed cross-sections by the first and the second pin processing parts in pressing the pin equivalent portions as long as it does not cause outflow of material and formation of flash.

Figure 16A:
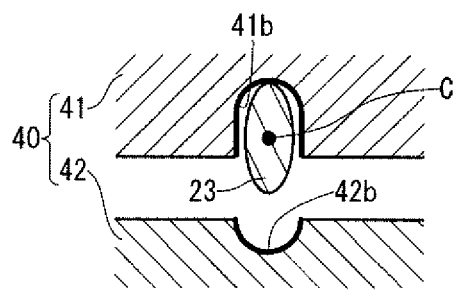
FIG. 16A is a cross-sectional view of a pin equivalent portion showing a state at the start of pressing in the second preforming step in a case where each pin equivalent portion is partly pressed without a closed cross-section formed by a pin processing portion in the second preforming step.
Figure 16B:
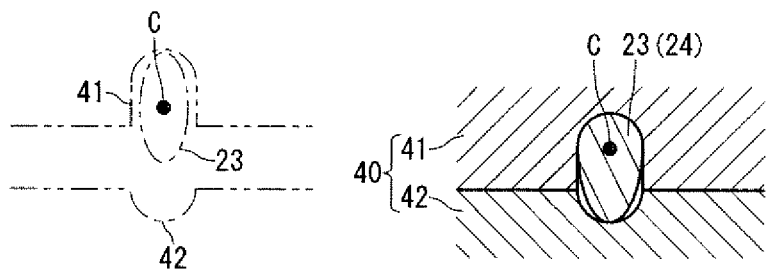
FIG. 16B is a cross-sectional view of the pin equivalent portion showing a state at the completion of pressing in the second preforming step in which each pin equivalent portion is partly pressed without a closed cross-section formed by a pin processing portion in the second preforming step.

FIGS. 16A and 16B are cross-sectional views of a pin equivalent portion showing a case where each of the pin equivalent portions is pressed without a closed cross-section formed by the pin processing parts. FIG. 16A shows a state at the time of pressing, and FIG. 16B shows a state at the completion of pressing. The case shown in FIGS. 16A and 16B differs from the case shown in FIGS. 9A and 9B in the shapes of the pin processing parts 41b and 42b. In the case shown in FIGS. 16A and 16B, the pin processing part 41b provided in the upper die 41 and the pin processing part 42b provided in the lower die 42 are recessed. The depth of the pin processing part 41b provided in the upper die 41 is greater than the depth of the pin processing part 42b provided in the lower die 42.

By the pair of dies having such pin processing parts 41b and 42b, along with a downward movement of the upper die 41, the third position pin equivalent portion (flat portion) is mostly housed in the pin processing part 41b provided in the upper die 41. Then, the third position pin equivalent portion (flat portion) is decentered along the pressing direction. At this time, the upper pin processing part 41b and the lower pin processing part 42b are partly contact the pin equivalent portion of the initial blank 23. In other words, the portions of the pin processing parts 41b and 42b near the parting faces do not contact the pin equivalent portion. Also, along with the decentering of the pin equivalent portion, the material flows out in the axial direction, and the pin equivalent portion is pressed, whereby the cross-sectional area thereof is decreased. Thus, it is possible to decenter and press the pin equivalent portion without forming flash.

When the volume distribution is to be facilitated in the second preforming step, it is preferred that each of the pin equivalent portions is pressed while a closed cross-section is formed by the first and the second pin processing parts. With a view to preventing outflow of material, it is preferred that each of the pin equivalent portions is partly pressed by the pin processing parts. When outflow of material and formation of flash are to be prevented by the partial pressing by the pin processing parts, the pin processing parts may have the same structures as the journal equivalent portions which will be described later with reference to FIG. 17.

In the above-described process flow of the second preforming step, the journal equivalent portions are pressed while closed cross-sections are formed by the first and the second journal processing parts. In the forged crankshaft production method according to the present embodiment, however, it is not necessary to form closed cross-sections by the first and the second journal processing parts in pressing the journal equivalent portions as long as it does not cause outflow of material and formation of flash. For example, the journal processing parts may have the same structures of the pin processing parts shown in FIGS. 16A and 16B.

Figure 17A:
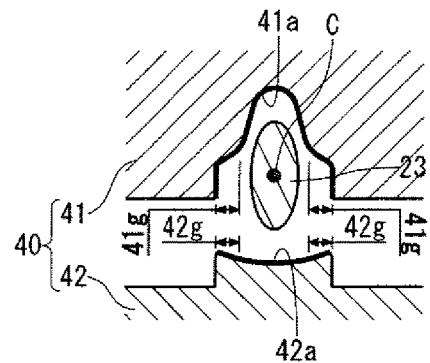
FIG. 17A is a cross-sectional view of a portion to be formed into a journal showing a state at the start of pressing in the second preforming step in a case where each portion to be formed into a journal is partly pressed without a closed cross-section formed by a journal processing portion in the second preforming step.
Figure 17B:
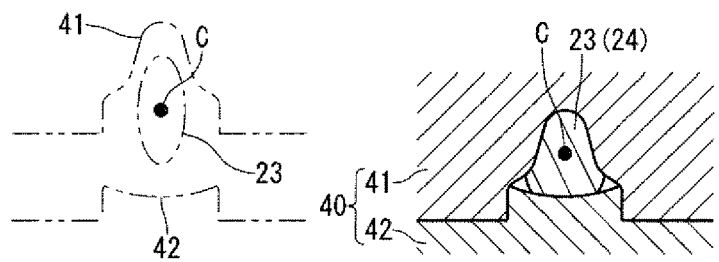
FIG. 17B is a cross-sectional view of the portion to be formed into a journal showing a state at the completion of pressing in the second preforming step in which each portion to be formed into a journal is partly pressed without a closed cross-section formed by a journal processing portion.

FIGS. 17A and 17B are cross-sectional views of a journal equivalent portion showing a case where each of the journal equivalent portions is pressed without a closed cross-section formed by the journal processing parts. FIG. 17A shows a state at the start of pressing, and FIG. 17B shows a state at the completion of pressing. The case shown in FIGS. 17A and 17B differs from the case shown in FIGS. 11A and 11B in the shapes of the journal processing parts 41a and 42a. In the case shown in FIGS. 17A and 17B, as indicated by the heavy lines in FIG. 17A, the journal processing part provided in the upper die 41 is recessed and is capable of entirely housing a flat portion of the initial blank 23, that is, the first journal processing part 41a. The journal processing part provided in the lower die 42 is arc-shaped, that is, the second journal processing part 42a, and the second processing part 42a is located on the edge surface of a raised portion as indicated by the heavy line in FIG. 17A. The journal processing parts 41a and 42a have clearances 41g and 42g at both sides in the width direction, and the clearances 41g and 42g project outward in the width direction.

By the pair of dies having such journal processing parts 41a and 42a, along with a downward movement of the upper die 41, each of the flat portions of the initial blank 23 is entirely housed in the first journal part 41a. When the upper die 41 is moved further down, the first journal processing part 41a contacts the flat portion, and subsequently, the second journal processing part 42a contacts the flat portions. By the contacts, the flat portion is pressed, and the sectional area thereof is decreased. At the time, the material flows in the axial direction, whereby the volume is distributed. In this regard, the material partly flows in the clearances 41g and 42g, but the clearances 41g and 42g are partly kept out of contact with the flat portion. Thus, the flat portion is partly pressed, and the material does not flow out, thereby resulting in formation of no flash.

When the volume distribution in the second preforming step is to be facilitated, it is preferred that each of the flat portions is entirely pressed while a closed cross-section is formed by the first journal processing part 41a and the second journal processing part 42a. With a view to preventing outflow of material, it is preferred that each of the journal equivalent portions is partly pressed by the journal processing parts.

7. Another Example of First Preforming Step

In the above-described process flow of the first preforming step, the first pair of dies 30 is used, and closed cross-sections are formed by the first journal processing parts 31a and the second journal processing parts 32a. Also, closed cross-sections are formed by the first pin processing parts 31b and the second pin processing parts 32b. In this state, the entire circumferences of the journal equivalent portions and the pin equivalent portion of the billet are pressed, and this prevents outflow of material and formation of flash. In the forged crankshaft production method according to the present embodiment, however, outflow of material and formation of flash may be prevented by partial pressing of the journal equivalent portions by the journal processing parts of the first pair of dies.

Figure 18A:
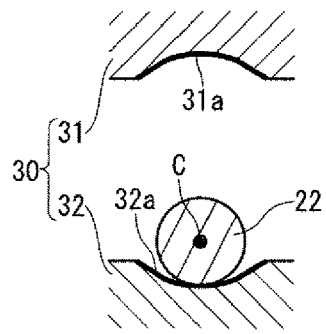
FIG. 18A is a cross-sectional view of a portion to be formed into a journal showing a state before pressing in an exemplary flow to partly press each portion to be formed into a journal by a journal processing portion in the first preforming step.
Figure 18B:
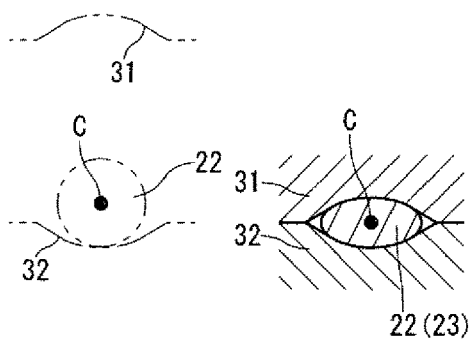
FIG. 18B is a cross-sectional view of the portion to be formed into a journal showing a state at the completion of pressing in the exemplary flow to perform partial pressing by the journal processing portion in the first preforming step.

FIGS. 18A and 18B are cross-sectional views of a journal equivalent portion showing a process flow to partly press the journal equivalent portion by the journal processing parts in the first preforming step. FIG. 18A shows a state before pressing, and FIG. 18B shows a state at the completion of pressing. The journal processing parts 31a and 32a shown in FIGS. 18A and 18B differ from those shown in FIGS. 6A and 6B in shape. As indicated by the heavy lines in FIG. 18A, the journal processing part 31a provided in the upper die 31 and the journal processing part 32a provided in the lower die 32 are recessed and have the same depth.

By the pair of dies having such journal processing portions, along with a downward movement of the upper die 31, the bottoms of the journal processing parts 31a provided in the upper die 31 and the journal processing parts 32a provided in the lower die 32 come into contact with the billet 22. When the upper die 31 is moved further down, the journal processing parts 31a provided in the upper die 31 and the journal processing parts 32a provided in the lower die 32 partly come into contact with the billet 22. In other words, the portions of the journal processing parts 31a and 32a around the parting faces do not contact the billet 22. Accordingly, it is possible to form flat portions having decreased sectional areas without forming flash.

With a view to facilitating volume distribution, it is preferred that the billet is entirely pressed while the journal processing parts of each of the journal processing portions form a closed cross-section as shown in FIGS. 6A and 6B. With a view to preventing outflow of material, it is preferred that partial pressing of the billet is performed by each of the journal processing portions as shown in FIGS. 18A and 18B.

The pin processing portions provided in the first pair of dies may have a structure similar to the structure of the journal processing portions shown in FIGS. 18A and 18B though it is not shown in the drawings, and the pin processing portions may perform partial pressing of a billet. With a view to facilitating volume distribution, it is preferred that the billet is entirely pressed while the pin processing parts of each of the pin processing portions form a closed cross-section as shown in FIGS. 5A and 5B. With a view to preventing outflow of material, it is preferred that the billet is partly pressed by each of the journal processing portions.

8. Preferred Examples

The ratio (Sp2/Sp0) of the sectional area Sp2 ($mm^2$) of each of the pin equivalent portions of the intermediate blank to the sectional area Sp0 ($mm^2$) of each of the pins of the forged crankshaft (final product) is desirably 0.7 to 1.9 with a view to diminishing flash formed in the after steps. For the same purpose, the ratio (Sp1/Sp0) of the sectional area Sp1 ($mm^2$) of each of the pin equivalent portions of the initial blank to the sectional area Sp0 ($mm^2$) of each of the pins of the forged crankshaft (final product) is desirably 0.9 to 1.9.

The amount of decentering (mm) of the second position pin equivalent portion in the first preforming step, that is, the amount of decentering (mm) of the second pin equivalent portion of the initial blank 23 is desirably not less than 20%, more desirably not less than 50%, and ideally 100% of the amount of decentering (mm) of the pin of the forged crankshaft (final product). If the amount of decentering of the pin equivalent portion in the first preforming step is too small, the pin equivalent portion will need to be decentered greatly in the finish forging step after the final preforming step, and with the increase of the amount of decentering in the finish forging step, outflow of material and formation of flash will be increased.

The amounts of decentering (mm) of the first position pin equivalent portion and the third position pin equivalent portion in the final preforming step, that is, the amounts of decentering (mm) of the first pin equivalent portion and the third pin equivalent portion of the final blank 25 are adjusted as appropriate according to the method of adjusting the placement angles of the pin equivalent portions in the after steps. When the amounts of decentering of the pins located at the first and the third positions of the forged crankshaft (final product) are denoted by E (mm), the amounts of decentering (mm) of the first position pin equivalent portion and the third pin equivalent portion shall be $E \times 3^{1/2}/2$ in a case where the placement angles are adjusted in the finish forging step as shown in FIGS. 3D and 3E. In a case where the placement angles of the pin equivalent portions are adjusted in the twisting step, the amounts of decentering (mm) of the first position pin equivalent portion and the third pin equivalent portion in the final preforming step shall be E.

In a case where the placement angles of the pin equivalent portions are adjusted in the finish forging step, the amounts of decentering (mm) of the first position pin equivalent portion and the third position pin equivalent portion in the second preforming step, that is, the amounts of decentering (mm) of the first position pin equivalent portion and the third position pin equivalent portion of the initial blank 24 are desirably 20 to 70% and more desirably 40 to 50% of the amounts of decentering (mm) of the pins of the forged crankshaft (final product), with a view to facilitating volume distribution inside each of the web equivalent portions. In a case where the placement angles of the pin equivalent portions are adjusted in the second preforming step, the amounts of decentering (mm) of the first position pin equivalent portion and the third position pin equivalent portion in the second preforming step, that is, the amounts of decentering (mm) of the first position pin equivalent portion and the third position pin equivalent portion of the initial blank 24 is desirably 20 to 70% and more desirably 40 to 50% of the amounts of decentering (mm) of the pins of the forged crankshaft (final product), with a view to facilitating volume distribution inside each of the web equivalent portions.

In the second preforming step, the ratio (t1/t0) of the thickness t1 (mm) of each of the web equivalent portions (portions to be formed into arms and portions to be formed into weights integrated with the arms) of the intermediate blank to the finished size t0 (mm) is desirably not less than 1.1, and more desirably not less than 1.5 with a view to improving the degree of filling of material in the weights in the after steps. If the ratio (t1/t0) is greater than 3.5, the bulging/deforming areas of the material surface will be too great, whereby the form accuracy of the outer peripherals of the arms may be decreased. Therefore, the ratio (t1/t0) is desirably not more than 3.5.

The ratio (Sw2/Sw0) of the sectional area Sw2 ($mm^2$) of each of the web equivalent portions of the intermediate blank to the sectional area Sw0 ($mm^2$) of each of the webs of the forged crankshaft (final product) is desirably 0.3 to 0.9 with a view to preventing deficiency in the weights while maintaining the degree of filling of material in the weights sufficiently high in the after steps. For the same purpose, the ratio (Sw1/Sw0) of the sectional area Sw1 ($mm^2$) of each of the web equivalent portions of the initial blank to the sectional area Sw0 ($mm^2$) of each of the webs of the forged crankshaft (final product) is desirably 0.2 to 0.8. The sectional area of a web equivalent portion means the total of the sectional area of a portion to be formed into an arm and the sectional area of a portion to be formed into a weight integrated with the arm. The sectional area of a web means the total of the sectional area of an arm and the sectional area of a weight integrated with the arm.

The ratio (Sj2/Sj0) of the sectional area Sj2 ($mm^2$) of each of the journal equivalent portions of the intermediate blank to the sectional area Sj0 ($mm^2$) of each of the journals of the forged crankshaft (final product) is desirably 1.0 to 1.9 with a view to diminishing flash formed in the after steps. For the same purpose, the ratio (Sj1/Sj0) of the sectional area Sj1 ($mm^2$) of each of the journal equivalent portions of the initial blank to the sectional area Sj0 ($mm^2$) of each of the journals of the forged crankshaft (final product) is desirably 1.2 to 1.9.

In the above-described process flow of the final preforming step shown in FIGS. 14A to 14C, either the movable pin die components 63 or the movable pin die components 73 are movable in a direction perpendicular to the axial direction relative to the plate 52 or 53 holding the components 63 or 73. In this case, after the intermediate blank 24 is pressed by the upper die 60 and the lower die 70, the movable journal die components 62 and 72 and the movable pin die components 63 and 73 are moved in the axial direction. Along with the axial movements, either the pin die components 63 of the upper die 60 or the pin die components 73 of the lower die 70 are relatively moved in the direction perpendicular to the axial direction to decenter the pin equivalent portions and more specifically to decrease the amounts of decentering of the first position pin equivalent portions and the third position pin equivalent portion. In the forged crankshaft production method according to the present embodiment, the final preforming step is not limited to a step with this configuration.

Specifically, both of the pin die components 63 and 73 may be immovable relative to the plates 52 and 53 holding the pin die components 63 and 73. In this case, the movable pin die components 63 and 73 connected to the hydraulic cylinder 54 are replaced with movable pin die components 63 and 73 that are relatively immovable in the direction perpendicular to the axial direction. When the intermediate blank 24 is pressed by the upper die 60 and the lower die 70, the first position pin equivalent portion and the third position pin equivalent portion are pressed. Thereby, the first position pin equivalent portion and the third position pin equivalent portion are decentered and are formed into approximate shapes of the pins.

With a view to improving the processing accuracy of the first position pin equivalent portion and the third position pin equivalent portion, it is preferred that either the pin die components 63 or the pin die components 73 are moved in the direction perpendicular to the axial direction for pressing of the pin equivalent portions along with the pressing in the axial direction as in the process flow of the final preforming step shown in FIGS. 14A to 14C. Thereby, the pin equivalent portions are decentered, and at the same time, the pin equivalent portions are formed into approximate shapes of the pins.

In the exemplary production process shown in FIGS. 3A to 3F, a billet 22 is used as the workpiece. However, a stepped blank may be used as the workpiece.

Figure 19:
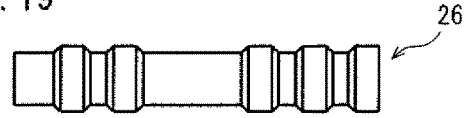
FIG. 19 is a diagram showing an example of a shape of a stepped blank.

FIG. 19 is a diagram showing an example of a shape of a stepped blank. In the stepped blank 26 shown in FIG. 19, the pin equivalent portions and the journal equivalent portions are pressed compared with the web equivalent portions as in the initial blank 23 shown in FIG. 3B. In other words, the sectional area of each of the pin equivalent portions and the journal equivalent portions is smaller than the sectional area of each of the web equivalent portions (the total sectional area of a portion to be formed into an arm and a portion to be formed into a weight integrated with the arm). Unlike in the initial blank 23 shown in FIG. 3B, none of the pin equivalent portions of the stepped blank 26 is decentered. The stepped blank 26 is obtained by pressing some parts of a billet by use of press rolls or cross rolls.

When such a stepped blank is used as the workpiece, in the first preforming step, the stepped blank is pressed by the above-described first pair of dies. Specifically, the pin equivalent portions are pressed by the pin processing portions, whereby the cross-sectional areas of the pin equivalent portions are decreased, which results in formation of flat portions. Also, the journal equivalent portions are pressed by the journal processing portions, whereby the cross-sectional areas of the journal equivalent portions are decreased, which results in formation of flat portions. Further, the second position pin equivalent portion is decentered.

As mentioned above, the placement angles of the pins can be adjusted in the finish forging step or in the twisting step. With a view to consolidating processing, it is preferred that the first position pin equivalent portion is pressed and offset in the pressing direction to be placed in the first position in the finish die forging step.

In the exemplary process flow of the final preforming step shown in FIGS. 14A to 14C, the fixed pin die component 64 is a separate component from the fixed journal die component 61, and the fixed die component 74 is a separate component from the fixed journal die component 71. However, the die components 64 and 61 may be one component, and the die components 74 and 71 may be one component. In the exemplary process flow of the final preforming step shown in FIGS. 14A to 14C, the non-weight arm equivalent portions are pressed by the fixed journal die components 61 and 71. However, it is not always necessary to press the non-weight arm equivalent portions in the final preforming step.

In the above-described process flow of the final preforming step, as shown in FIGS. 14A to 14C, the direction of the pressing by the third pair of dies 51 is perpendicular to the decentering direction of the second position pin equivalent portion. However, the direction of the pressing may be along the decentering direction of the second position pin equivalent portion. When the direction of the pressing by the third pair of dies 51 is along the decentering direction of the second position pin equivalent portion, for decentering of the first position pin equivalent portion and the third position pin equivalent portion, the movable pin die components 63 and 73 shall be movable not in the direction of the pressing by the third pair of dies 51 but in a direction perpendicular to the direction of the pressing by the third pair of dies 51. In this case, both of the movable pin die components 63 and 73 shall be movable in the direction perpendicular to the direction of the pressing by the third pair of dies 51.

In a crankshaft, the positions of the respective far ends of the pins vary depending on various factors. Specifically, the far end of a pin may be in the same position as the tip of the arm or may be in an inner position than the tip of the arm along the decentering direction. In either case, the forged crankshaft production method according to the present embodiment is applicable. As shown in FIG. 1B, the far end PT of the pin P1 is the point of the pin P1 that is the farthest from the center of the journal J1. As shown in FIG. 1B, the tip AT of the arm A1 is the point of the arm A1 (portion excluding the weight W1) that is the farthest from the center of the journal J1.

9. Front Part and Flange

Next, an exemplary process flow to process a portion to be formed into the front part (which will hereinafter be referred to as a "front equivalent portion") and a portion to be formed into the flange (which will hereinafter be referred to as a "flange equivalent portion") is described.

Figure 20A:
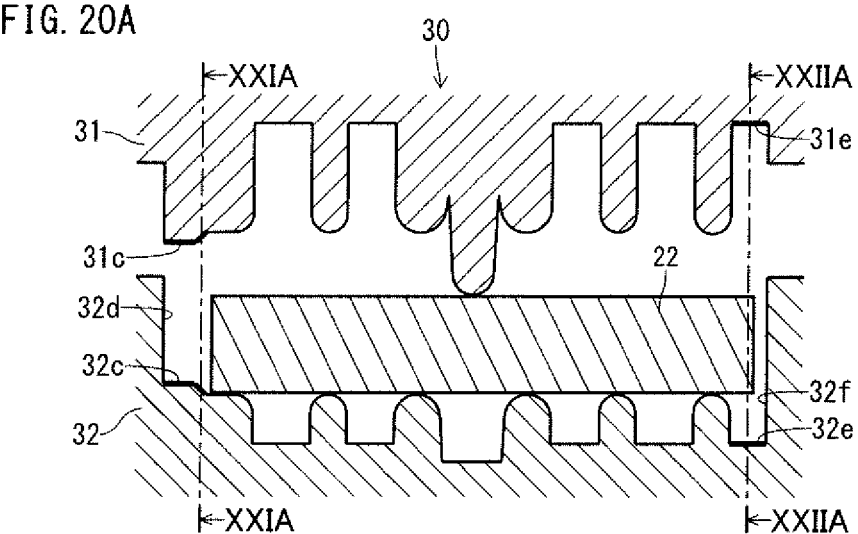
FIG. 20A is a longitudinal sectional view showing a state before pressing in an exemplary process flow to process a portion to be formed into a front part and a portion to be formed into a flange in the first preforming step.

FIGS. 20A to 22B are diagrams showing the exemplary process flow to process the front equivalent portion and the flange equivalent portion in the first preforming step. FIG. 20A is a longitudinal sectional view showing a state before pressing, and FIG. 20B is a longitudinal sectional view showing a state at the completion of pressing.

Figure 20B:
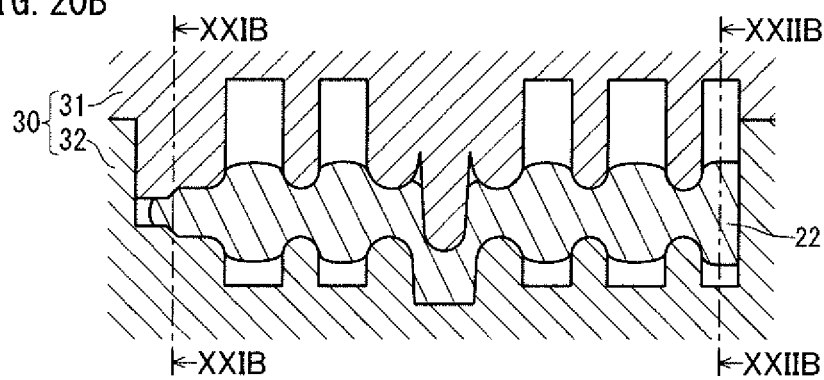
FIG. 20B is a longitudinal sectional view showing a state at the completion of pressing in the exemplary process flow to process the portion to be formed into the front part and the portion to be formed into the flange in the first preforming step.
Figure 21A:
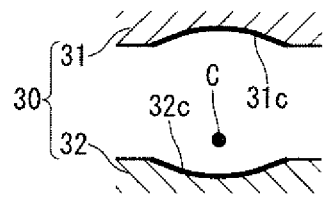
FIG. 21A is a cross-sectional view of the portion to be formed into the front part before undergoing pressing in the exemplary process flow of the first preforming step.
Figure 21B:
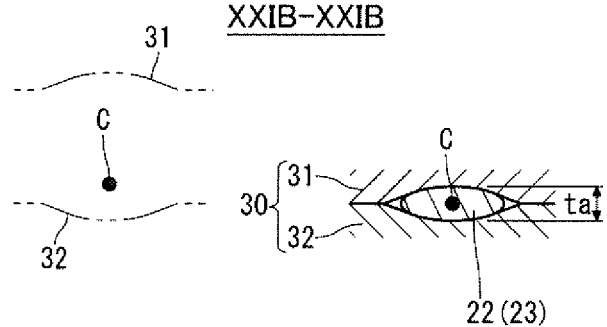
FIG. 21B is a cross-sectional view of the portion to be formed into the front part at the completion of pressing in the exemplary process flow of the first preforming step.

FIGS. 21A and 21B are cross-sectional views of the front equivalent portion. FIG. 21A shows a state before pressing, and FIG. 21B shows a state at the completion of pressing. FIG. 21A is a sectional view along the line XXIA-XXIA in FIG. 20A, and FIG. 21B is a sectional view along the line XXIB-XXIB in FIG. 20B.

Figure 22A:
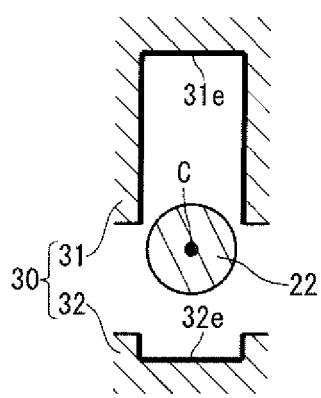
FIG. 22A is a cross-sectional view of the portion to be formed into the flange before undergoing pressing in the exemplary process flow of the first preforming step.
Figure 22B:
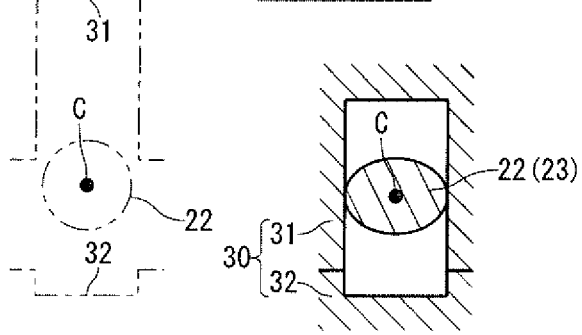
FIG. 22B is a cross-sectional view of the portion to be formed into the flange at the completion of pressing in the exemplary process flow of the first preforming step.

FIGS. 22A and 22B are cross-sectional views of the flange equivalent portion. FIG. 22A shows a state before pressing, and FIG. 22B shows a state at the completion of pressing. FIG. 22A is a sectional view along the line XXIIA-XXIIA in FIG. 20A, and FIG. 22B is a sectional view along the line XXIIB-XXIIB in FIG. 20B.

In FIGS. 20A to 22B, a billet 22 having a round cross-sectional shape, and a first pair of dies 30 composed of an upper die and a lower die are shown. For easy understanding of the drawings, in FIGS. 21B and 22B, the first upper die 31 and the first lower die 32 before pressing are indicated by two-dot chain lines, and the axis position C of the journal equivalent portion is indicated by a black circle. In FIG. 22B, the billet 22 is further indicated by a two-dot chain line. The first pair of dies 30 shown in FIGS. 20A to 22B includes pin processing portions and journal processing portions as the first pair of dies 30 shown in FIGS. 4A to 7B. The first pair of dies 30 further includes a front processing portion to come into contact with the front equivalent portion.

In this exemplary process flow, the front processing portion includes inner surfaces 31c and 32c as indicated by the heavy lines in FIGS. 20A and 21A, and an edge surface 32d as shown in FIG. 20A. The inner surfaces 31c and 32c of the front processing portion face the periphery of the front equivalent portion. The edge surface 32d of the front processing portion faces the end surface of the front equivalent portion. The cross-sectional shapes of the front processing part provided in the upper die 31 and the front processing part provided in the lower die 32 are both recessed, and the recessed parts have the same depth.

By the pair of dies including the front processing portion, along with a downward movement of the upper die 31, the bottoms of the front processing parts provided in the upper die 31 and the lower die 32 (in this exemplary process flow, the inner surfaces 31c and 32c) come into contact with the periphery of the front equivalent portion of the billet 22. When the upper die 31 is moved further down, both of the front processing parts (inner surfaces 31c and 32c) provided in the upper die 31 and the lower die 32 partly contact the periphery of the billet. In other words, the portions of the front processing parts (inner surfaces 31c and 32c) near the parting faces do not contact the periphery of the billet 22. Accordingly, it is possible to decrease the sectional area, thereby resulting in formation of a flat portion, without forming flash. Moreover, by elongating the front equivalent portion in the axial direction along with the formation of a flat portion, it is possible to distribute the volume in the axial direction. Thus, the material yield rate can be further improved.

The front processing portion of the third pair of dies 30 is not limited to the structure shown in FIGS. 21A and 21B for partial pressing of the periphery of the billet, and the front processing portion may have a structure similar to the structure of the journal processing portions shown in FIGS. 6A and 6B. In short, the front processing portion may include a first front processing part provided in one of the first dies and a second front processing part provided in the other of the first dies, and the first front processing part may be recessed and capable of housing the front equivalent portion of a billet. In this case, the front processing parts form a closed cross-section, and in the state, the entire front equivalent portion (the entire periphery of the front equivalent portion) of the billet is pressed. This makes it possible to decrease the sectional area, thereby resulting in formation of a flat portion, without forming flash. Moreover, by elongating the front equivalent portion in the axial direction along with the formation of a flat portion, it is possible to distribute the volume in the axial direction. Thus, the material yield rate can be further improved.

During the pressing in the first preforming step, when the end surface of the front equivalent portion entirely contacts the front processing part, the elongation of the front equivalent portion is stopped, and the material may partly flow out into the space. In order to prevent this outflow, it is preferred that the end surface of the front equivalent portion is prevented from contacting the front processing part (in this process flow, the edge surface 32d) during the pressing in the first preforming step. In other words, it is preferred that a space is made between the end surface of the front equivalent portion and the front processing part (edge surface 32d). Alternatively, the end surface of the front equivalent portion may partly contact the front processing part (edge surface 32d).

If the rate of decrease of the sectional area of the front equivalent portion during the first preforming step is set too high, fishtail will occur in the end portion, which may cause a defect in the after steps. The fishtail means that a recess is formed in the end portion of the front equivalent portion, whereby the end portion is formed into a fish tail shape. In order to prevent the fishtail, it is preferred that the pressing is carried out in the first preforming step such that the sectional area of the front equivalent portion of the initial blank 23 to be obtained thereby will decrease with decreasing distance from the end surface of the front equivalent portion. The decrease of the sectional area of the front equivalent portion can be achieved by decreasing the thickness ta linearly, in a curve or in a staircase pattern, for example. In the case of FIGS. 20B and 21B, the thickness ta of the front equivalent portion decreases linearly in a part of the whole dimension in the axial direction and is constant in the other part. It is possible to adjust the thickness ta of the front equivalent portion by adjusting the shapes of the front processing parts provided in the first dies 30 (in this process flow, the inner surfaces 31c and 32c of the front processing portion) as appropriate.

When the front equivalent portion of the initial blank 23 is made such that the thickness ta thereof decreases with decreasing distance from the end surface of the front equivalent portion, the sectional area of the journal-facing side of the front equivalent portion is slightly greater than the sectional area of the end-surface side of the front equivalent portion. In this case, the pressing in the next second preforming step permits the end-surface side of the front equivalent portion and the journal-facing side of the front equivalent portion to have substantially the same sectional area without forming flash. Thus, even when the front equivalent portion of the initial blank 23 is made such that the thickness ta thereof decreases with decreasing distance from the end surface of the front equivalent portion, the material yield rate can be maintained high.

In this exemplary process flow, the flange processing portion includes inner surfaces 31e and 32e as indicated by the heavy lines in FIGS. 20A and 22A, and an edge surface 32f as shown in FIG. 20A. The inner surfaces 31e and 32e of the flange processing portion face the periphery of the flange equivalent portion. The edge surface 32f of the flange processing portion faces the end surface of the flange equivalent portion.

With a view to further improving the material yield rate, it is desired that the sectional area of the flange equivalent portion is increased in the first preforming step. For this purpose, it is preferred that the end surface of the flange equivalent portion is brought into contact with the flange processing part (in this exemplary flow, the edge surface 32f) along with the pressing by the first pair of dies. In this case, while the sectional area of the journal equivalent portion connected to the flange equivalent portion is being decreased, whereby the journal equivalent portion is formed into a flat portion, the material flows into the flange equivalent portion. At this time, since the end surface of the flange equivalent portion is held by the flange processing part (edge surface 32f), the sectional area of the flange equivalent portion increases. Thus, the volume is distributed in the axial direction, and the material yield rate can be further improved.

In order to facilitate the increase of the sectional area of the flange equivalent portion, it is preferred that the periphery of the flange equivalent portion is prevented from contacting the first dies (in this process flow, the inner surfaces 31e and 32e) in the first preforming step. Alternatively, for adjustment of the shape (dimensions) of the flange equivalent portion, the periphery of the flange equivalent portion may partly contact the first dies (in this process flow, the inner surfaces 31e and 32e) (see FIGS. 22A and 22B).

At the start of pressing in the first preforming step, the end surface of the flange equivalent portion may be brought into contact with the flange processing part (in this process flow, the edge surface 32f). Alternatively, there may be a space between the end surface of the flange equivalent portion and the flange processing part (edge surface 32f) at the start of pressing, and the end surface of the flange equivalent portion may be brought into contact with the flange processing part (edge surface 32f) during the pressing. Either the former or the latter shall be selected depending on the outer diameter (sectional area) of the flange of the crankshaft (final product).

Next, an exemplary process flow to process the front equivalent portion and the flange equivalent portion in the second preforming step is described.

Figure 23A:
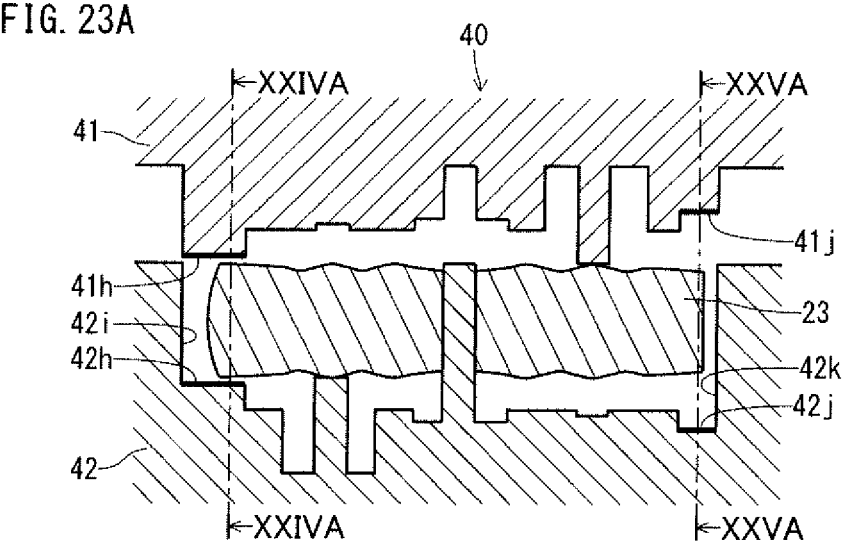
FIG. 23A is a longitudinal sectional view showing a state before pressing in an exemplary process flow to process the portion to be formed into the front part and the portion to be formed into the flange in the second preforming step.
Figure 23B:
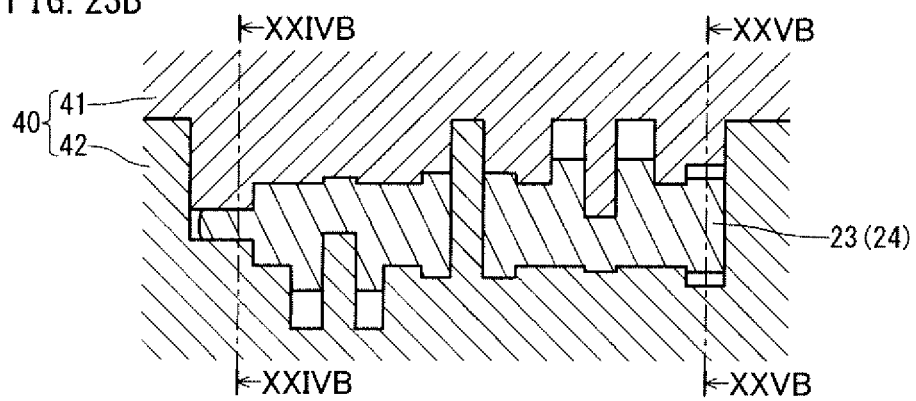
FIG. 23B is a longitudinal sectional view showing a state at the completion of pressing in the exemplary process flow to process the portion to be formed into the front part and the portion to be formed into the flange in the second preforming step.

FIGS. 23A to 25B are diagrams showing the exemplary process flow to process the front equivalent portion and the flange equivalent portion in the second preforming step. FIG. 23A is a cross-sectional view showing a state before pressing, and FIG. 23B is a cross-sectional view showing a state at the completion of pressing.

Figure 24A:
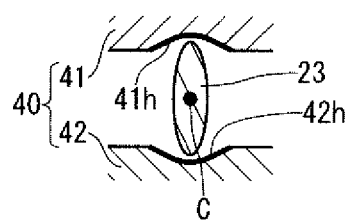
FIG. 24A is a cross-sectional view of the portion to be formed into the front part before undergoing pressing in the exemplary process flow of the second preforming step.
Figure 24B:
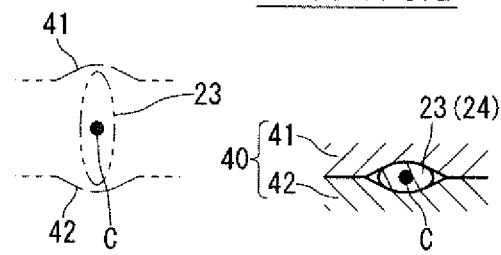
FIG. 24B is a cross-sectional view of the portion to be formed into the front part at the completion of pressing in the exemplary process flow of the second preforming step.

FIGS. 24A and 24B are cross-sectional views of the front equivalent portion in the second preforming step. FIG. 24A shows a state before pressing, and FIG. 24B shows a state at the completion of pressing. FIG. 24A is a cross-sectional view along the line XXIVA-XXIVA in FIG. 23A, and FIG. 24B is a cross-sectional view along the line XXIVB-XXIVB in FIG. 23B.

Figure 25A:
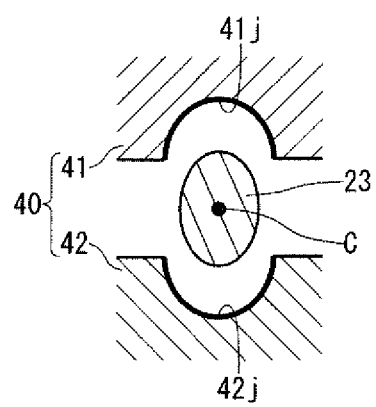
FIG. 25A is a cross-sectional view of the portion to be formed into the flange before undergoing pressing in the exemplary process flow of the second preforming step.
Figure 25B:
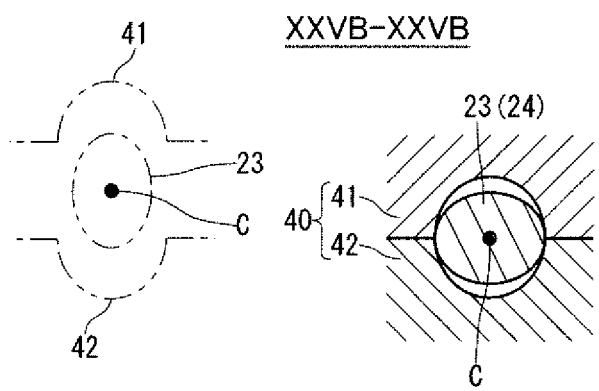
FIG. 25B is a cross-sectional view of the portion to be formed into the flange at the completion of pressing in the exemplary process flow of the second preforming step.

FIGS. 25A and 25B are cross-sectional views of the flange equivalent portion in the second preforming step. FIG. 25A shows a state before pressing, and FIG. 25B shows a state at the completion of pressing. FIG. 25A is a cross-sectional view along the line XXVA-XXVA in FIG. 23A, and FIG. 25B is a cross-sectional view along the line XXVB-XXVB in FIG. 23B.

In FIGS. 23A to 25B, the initial blank 23 and a second pair of dies 40 are shown. For easy understanding of the drawings, in FIGS. 24B and 25B, the second upper die 41, the second lower die 42 before pressing and the initial blank 23 are indicated by two-dot chain lines, and the axis position C of the journal equivalent portion is indicated by a black circle. The second pair of dies 40 shown in FIGS. 23A to 25B includes web processing portions, pin processing portions and journal processing portions as the second pair of dies 40 shown in FIGS. 8A to 13B. The second pair of dies 40 further includes a front processing portion to come into contact with the front equivalent portion.

In this exemplary process flow, the front processing portion includes inner surfaces 41h and 42h as indicated by the heavy lines in FIGS. 23A and 24A, and an edge surface 42i as shown in FIG. 23A. The inner surfaces 41h and 42h of the front processing portion face the periphery of the front equivalent portion. The edge surface 42i of the front processing portion faces the end surface of the front equivalent portion. As indicated by the heavy lines in FIG. 24A, the cross-sectional shape of the front processing part provided in the upper die 41 and the cross-sectional shape of the front processing part provided in the lower die 42 are both recessed, and the recessed portions have the same depth.

By the pair of dies including the front processing portion, along with a downward movement of the upper die 41, the bottoms of the front processing parts provided in the upper die 41 and the lower die 42 (in this exemplary process flow, the inner surfaces 41h and 42h) come into contact with the periphery of the flat portion (front equivalent portion) of the initial blank 23. When the upper die 41 is moved further down, both of the front processing parts (inner surfaces 41h and 42h) provided in the upper die 41 and the lower die 42 partly contact the periphery of the front equivalent portion. In other words, the portions of the front processing parts (inner surfaces 41h and 42h) near the parting faces do not contact the periphery of the front equivalent portion. Accordingly, it is possible to decrease the sectional area of the front equivalent portion by the pressing without forming flash. Moreover, by elongating the front equivalent portion in the axial direction along with the decrease of the sectional area of the front equivalent portion, it is possible to distribute the volume in the axial direction. Thus, the material yield rate can be further improved.

The front processing portion of the second pair of dies 40 are not limited to the structure shown in FIGS. 24A and 24B for partial pressing of the periphery of the front equivalent portion, and the front processing portion may have a structure similar to the structure of the journal processing portions shown in FIGS. 11A and 11B. In short, the front processing portion may include a first front processing part provided in one of the first dies and a second front processing part provided in the other of the first dies, and the first front processing part may be recessed and capable of housing the front equivalent portion. In this case, during the pressing by the second pair of dies, the front processing parts form a closed cross-section, and in the state, the entire front equivalent portion (the entire periphery of the front equivalent portion) is pressed. This permits a decrease of the sectional area of the front equivalent portion without causing formation of flash. Moreover, by elongating the front equivalent portion in the axial direction along with the decrease of the sectional area of the front equivalent portion, it is possible to distribute the volume in the axial direction. Thus, the material yield rate can be further improved.

During the pressing in the second preforming step, when the end surface of the front equivalent portion entirely contacts the front processing portion, the elongation of the front equivalent portion is stopped, and the material may partly flow out. In order to prevent this outflow, it is preferred that the end surface of the front equivalent portion is prevented from contacting the front processing part (in this process flow, the edge surface 42i) during the pressing in the second preforming step. In other words, it is preferred that a space is made between the end surface of the front equivalent portion and the front processing part (edge surface 42i). Alternatively, the end surface of the front equivalent portion may partly contact the front processing part (edge surface 42i).

In this exemplary process flow, the flange processing portion includes inner surfaces 41j and 42j as indicated by the heavy lines in FIGS. 23A and 25A, and an edge surface 42k as shown in FIG. 23A. The inner surfaces 41j and 42j of the flange processing portion face the periphery of the flange equivalent portion. The edge surface 42k of the flange processing portion faces the end surface of the flange equivalent portion.

With a view to further improving the material yield rate, it is desired that the sectional area of the flange equivalent portion is increased in the second preforming step. For this purpose, it is preferred that the end surface of the flange equivalent portion is brought into contact with the flange processing part (in this exemplary flow, the edge surface 42k) along with the pressing of the flat portions. In this case, while the sectional area of the journal equivalent portion is being decreased by pressing of the journal equivalent portion connected to the flange equivalent portion, the material flows into the flange equivalent portion. At this time, since the end surface of the flange equivalent portion is held by the flange processing part (edge surface 42k), the sectional area of the flange equivalent portion increases. Thus, the volume is distributed in the axial direction, and the material yield rate can be further improved.

In order to facilitate the increase of the sectional area of the flange equivalent portion, it is preferred that the periphery of the flange equivalent portion is prevented from contacting the flange processing parts (in this process flow, the inner surfaces 41j and 42j) in the second preforming step. Alternatively, for adjustment of the shape (dimensions) of the flange equivalent portion, it is preferred that the periphery of the flange equivalent portion partly contacts the flange processing parts (in this process flow, the inner surfaces 41j and 42j) (see FIGS. 25A and 25B).

At the start of pressing in the second preforming step, the end surface of the flange equivalent portion may be brought into contact with the flange processing part (in this process flow, the edge surface 42k). Alternatively, there may be a space between the end surface of the flange equivalent portion and the flange processing part (edge surface 42k) at the start of pressing, and the end surface of the flange equivalent portion may be brought into contact with the flange processing part (edge surface 42k) during the pressing. Either the former or the latter shall be selected depending on the outer diameter (cross-sectional area) of the flange of the crankshaft (final product).

INDUSTRIAL APPLICABILITY

The present invention is efficiently utilized in production of a forged crankshaft to be mounted in a reciprocating engine.

LIST OF REFERENCE SYMBOLS 11, 21: forged crankshaft
12, 22: billet
13: rolled blank
14: bent blank
15: rough forged blank
16, 26: finish forged blank
23: initial blank
23a: flat portion
23b: open-side surface of web equivalent portion
24: intermediate blank
25: final blank
26: stepped blank
30: first pair of dies
31: first upper die
31a: first journal processing part
31b: first pin processing part
31c: inner surface of front processing portion
31e: inner surface of flange processing portion
32: first lower die
32a: second journal processing part
32b: second pin processing part
32c: inner surface of front processing portion
32d: edge surface of front processing portion
31e: inner surface of flange processing portion
32f: edge surface of flange processing portion
40: second pair of dies
41: second upper die
41a: first journal processing part
41b: first pin processing part
41c: flat web equivalent portion
41f: second pin processing part
41g: clearance
41h: inner surface of front processing portion
41j: inner surface of flange processing portion
42: second lower die
42a: second journal processing part
42b: second pin processing part
42c: recessed web processing part
42d: arm processing part
42e: weight processing part
42f: first pin processing part
42g: clearance
42h: inner surface of front processing portion
42i: edge surface of front processing portion
42j: inner surface of flange processing portion
42k: edge surface of flange processing portion
51: third pair of dies
52: upper plate
53: lower plate
54: hydraulic cylinder
60: third upper die
61: fixed journal die component
62: movable journal die component
63: movable pin die component
64: fixed pin die component
70: third lower die
71: fixed journal die component
72: movable journal die component
73: movable pin die component
74: fixed pin die component
A, A1 to A8: crank arm
B: flash
J, J1 to J4: journal
P, P1 to P3: pin
Fr: front part
Fl: flange
W, W1 to W4: counterweight
PA, PA1 to PA3: pin equivalent portion

The invention claimed is:

1. A method for producing a forged crankshaft including journals serving as a center of rotation, pins decentered from the journals and located at a first position, a second position and a third position, respectively, having phase differences of 120 degrees thereamong, crank arms connecting the journals and the pins, and counterweights integrated with some or all of the crank arms, the method comprising:

a first preforming step of pressing a workpiece by a first pair of dies to decrease sectional areas of portions of the workpiece to be formed into the pins and sectional areas of portions of the workpiece to be formed into the journals, thereby forming the portions to be formed into the pins and the portions to be formed into the journals into flat portions, and to decenter one of the flat portions to be formed into the pin located at the second position;

a second preforming step of pressing an initial blank obtained by the first preforming step by a second pair of dies with a direction perpendicular to the decentering direction of the portion to be formed into the pin located at the second position set as a pressing direction to decenter the portion to be formed into the pin located at the first position and to decenter the portion to be formed into the pin located at the third position to a side opposite to the portion to be formed into the pin located at the first position;

a final preforming step of pressing an intermediate blank obtained by the second preforming step by a third pair of dies to further decenter the portion to be formed into the pin located at the first position and to further decenter the portion to be formed into the pin located at the third position, wherein:

the workpiece is a billet or a stepped blank;

the stepped blank has small sectional areas in the portions to be formed into the pins and in the portions to be formed into the journals, the small sectional areas being smaller than a total of a sectional area of a portion to be formed into a crank arm incorporating a counterweight and a sectional area of a portion to be formed into the counterweight integrated with the crank arm;

the first pair of dies includes pin processing portions to come into contact with the portions to be formed into the pins and journal processing portions to come into contact with the portions to be formed into the journals; and in the first preforming step, the workpiece is pressed by the pin processing portions and the journal processing portions, whereby the flat portions are formed.

2. The method for producing a forged crankshaft according to claim 1, wherein
in the final preforming step, the direction of the pressing by the third pair of dies is perpendicular to the decentering direction of the portion to be formed into the pin located at the second position.

3. The method for producing a forged crankshaft according to claim 1, wherein:
the forged crankshaft further includes a front part located at a front end in an axial direction;
the first pair of dies further includes a front processing portion to come into contact with a portion of the workpiece to be formed into the front part; and
in the first preforming step, the front processing part elongates the portion to be formed into the front part in the axial direction while decreasing a sectional area of the portion to be formed into the front part to form the portion to be formed into the front part into a flat portion.

4. The method for producing a forged crankshaft according to claim 3, wherein:
in the first preforming step, the portion to be formed into the front part is pressed by the front processing portion such that, in the initial blank, a sectional area of the portion to be formed into the front part decreases with decreasing distance from an end surface of the front part.

5. The method for producing a forged crankshaft according to claim 1, wherein:
the forged crankshaft further includes a flange located at a rear end in the axial direction;
the first pair of dies further includes a flange processing portion to come into contact with a portion of the workpiece to be formed into the flange; and
in the first preforming step, while the flat portions are formed, an end surface of the portion to be formed into the flange is brought into contact with the flange processing portion, whereby a sectional area of the portion to be formed into the flange is increased.

6. The method for producing a forged crankshaft according to claim 1, wherein:
in the second preforming step, the portions to be formed into the crank arms incorporating the counterweights are processed to be thicker than a finished size, and the portions to be formed into the counterweights integrated with the crank arms are processed to be thicker than a finished size;
in the final preforming step, during the pressing by the third pair of dies, the portions of the intermediate blank to be formed into the crank arms incorporating the counterweights and the portions to be formed into the counterweights integrated with the crank arms are pressed from the axial direction of the intermediate blank.

7. The method for producing a forged crankshaft according to claim 1, wherein:
the second pair of dies used in the second preforming step includes web processing portions to come into contact with the portions to be formed into the crank arms incorporating the counterweights and the portions to be formed into the counterweights integrated with the crank arms;
each of the web processing portions includes an arm processing part to come into contact with a portion to be formed into a crank arm and a weight processing part to come into contact with a portion to be formed into a counterweight integrated with the crank arm, the arm processing part and the weight processing part being provided in one of the second pair of dies;
the arm processing part and the weight processing part form a recessed portion, where the arm processing part is located in a bottom side of the recessed portion and the weight processing part is located in an open side of the recessed portion;
a width of an open side of the weight processing part becomes greater with increasing distance from the bottom of the recessed portion;
in the second preforming step, as the portions to be formed into the pins located at the first position and at the third position are being decentered, the portions to be formed into the crank arms incorporating the counterweights and the portions to be formed into the counterweights integrated with the crank arms are pushed into the bottom sides of the web processing portions and are deformed.

8. The method for producing a forged crankshaft according to claim 7, wherein
in the second preforming step, when the portions to be formed into the crank arms incorporating the counterweights and the portions to be formed into the counterweights integrated with the crank arms are pushed into the bottom sides of the web processing portions and are deformed, the portions to be formed into the crank arms incorporating the counterweights and the portions to be formed into the counterweights integrated with the crank arms are pressed from the open sides of the web processing portions for volume distribution.

* * * * *